Feb. 15, 1966   F. B. HESS ETAL   3,234,830
GLASS TUBING SEVERING MACHINE
Filed Dec. 13, 1963   11 Sheets-Sheet 1
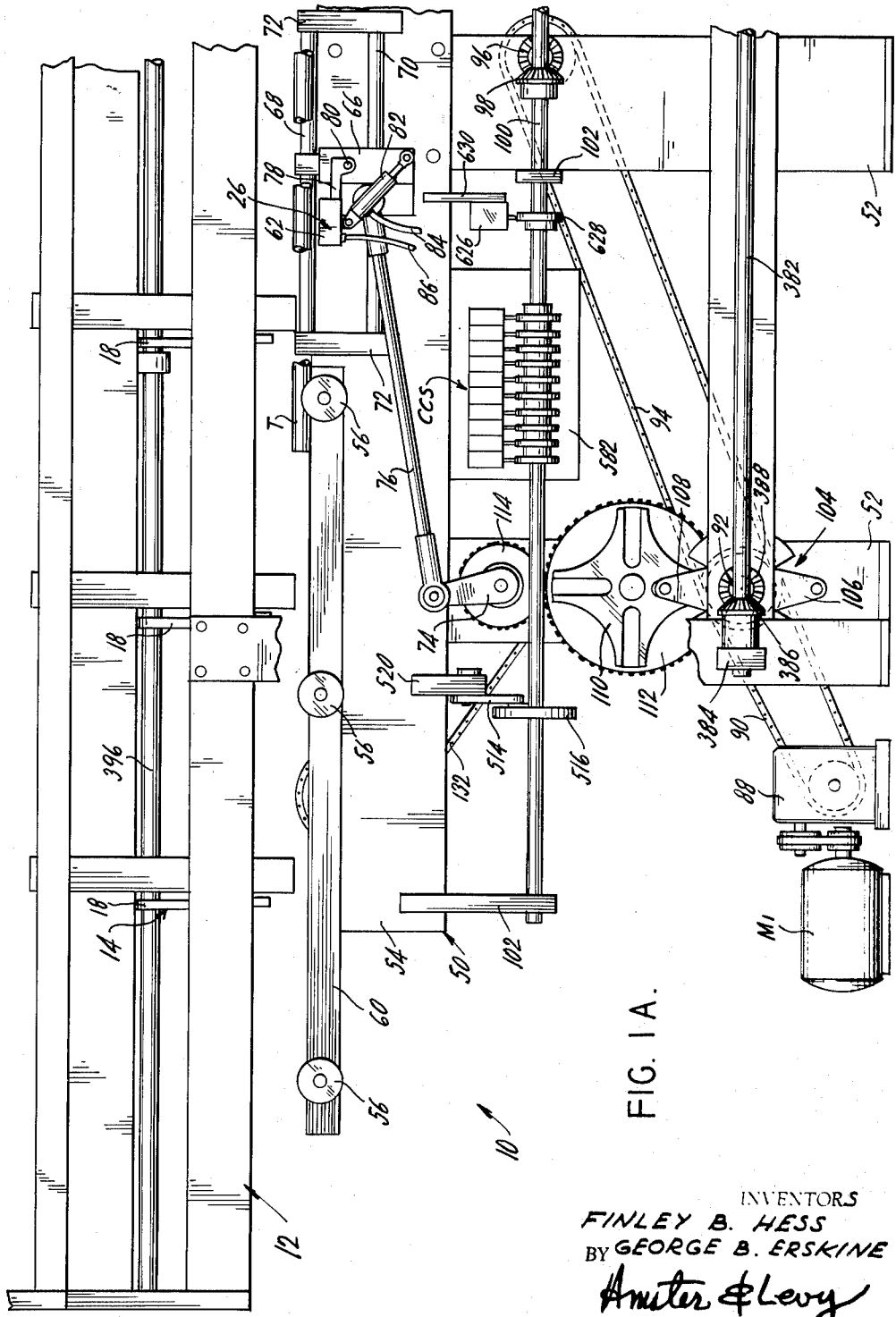
FIG. IA.
INVENTORS
FINLEY B. HESS
BY GEORGE B. ERSKINE
Amster & Levy
ATTORNEYS

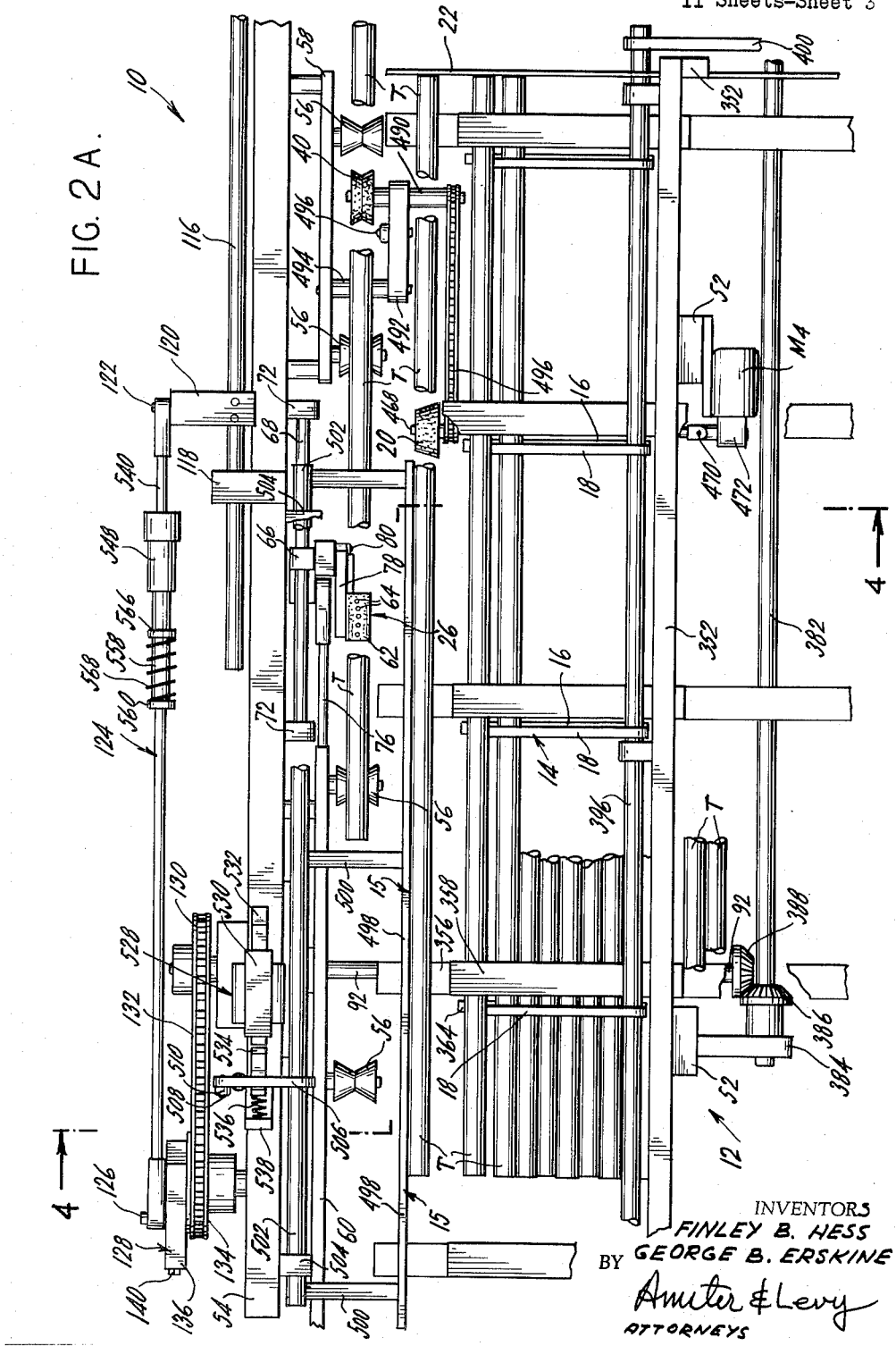

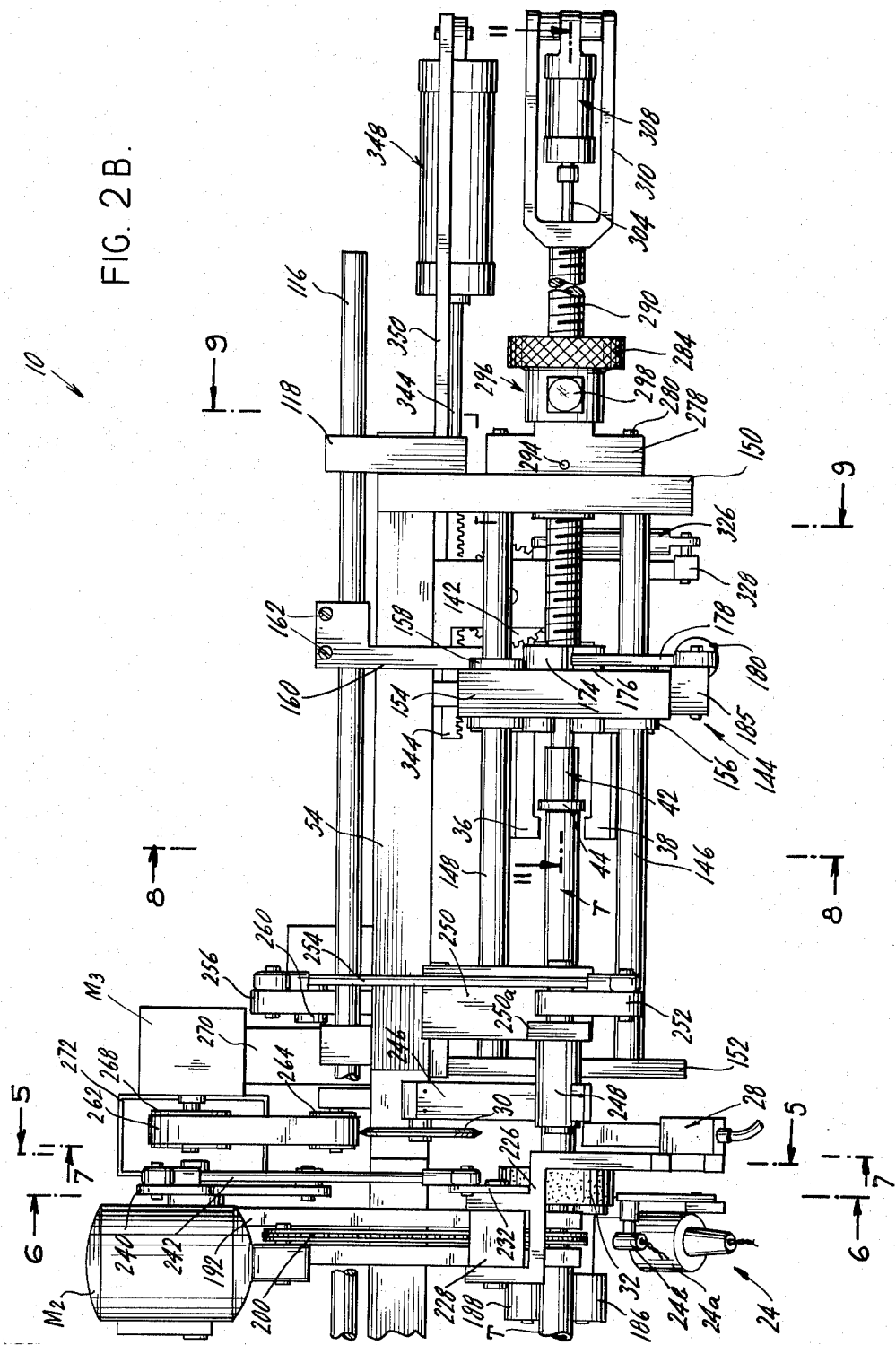

INVENTORS
FINLEY B. HESS
BY GEORGE B. ERSKINE

ATTORNEYS

INVENTORS
FINLEY B. HESS
GEORGE B. ERSKINE
BY Amster & Levy
ATTORNEYS

INVENTORS
FINLEY B. HESS
GEORGE B. ERSKINE
BY Amster & Levy
ATTORNEYS

Feb. 15, 1966  F. B. HESS ETAL  3,234,830
GLASS TUBING SEVERING MACHINE
Filed Dec. 13, 1963  11 Sheets-Sheet 8

INVENTORS
FINLEY B. HESS
BY GEORGE B. ERSKINE
Amster & Levy
ATTORNEYS

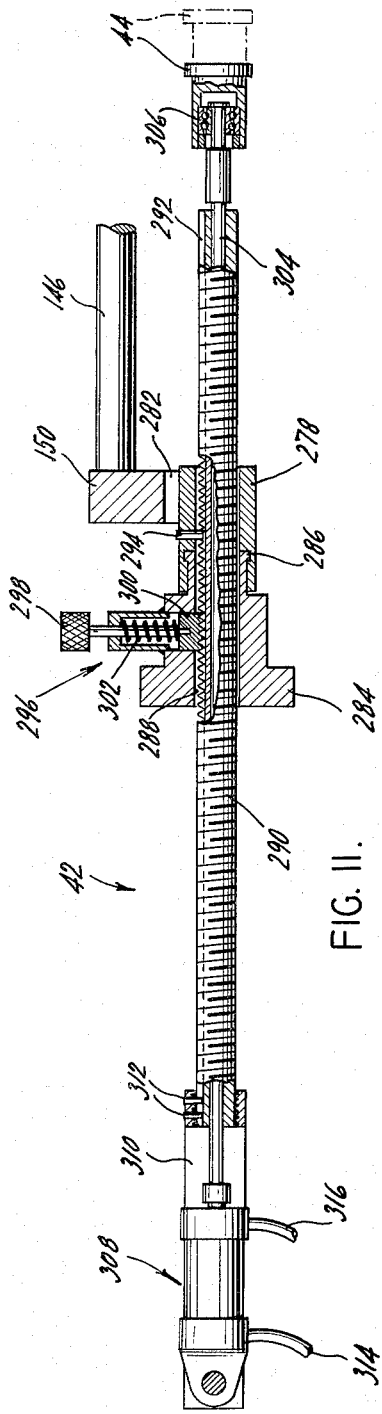
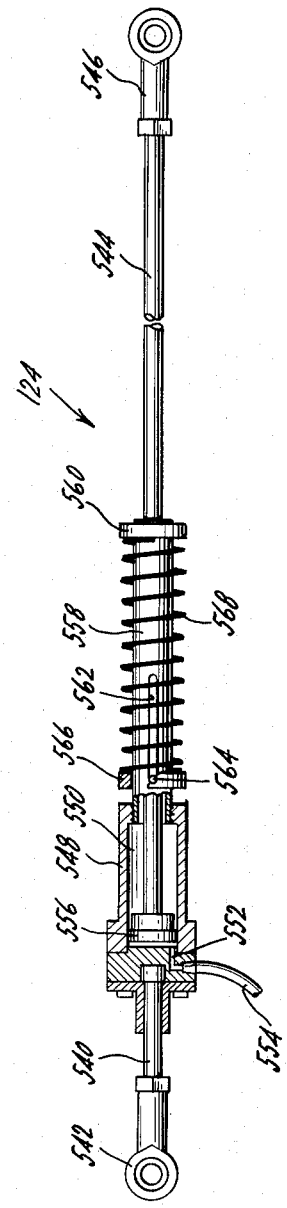
FIG. 11.
FIG. 12.
INVENTORS
FINLEY B. HESS
BY GEORGE B. ERSKINE
Amster & Levy
ATTORNEYS Feb. 15, 1966  F. B. HESS ETAL  3,234,830
GLASS TUBING SEVERING MACHINE
Filed Dec. 13, 1963   11 Sheets-Sheet 10

INVENTORS
FINLEY B. HESS
GEORGE B. ERSKINE
BY Armiter & Levy
ATTORNEYS

Feb. 15, 1966      F. B. HESS ETAL      3,234,830

GLASS TUBING SEVERING MACHINE

Filed Dec. 13, 1963      11 Sheets-Sheet 11

INVENTORS
FINLEY B. HESS
GEORGE B. ERSKINE
BY

Amster & Levy
ATTORNEYS

United States Patent Office 3,234,830
Patented Feb. 15, 1966

3,234,830
GLASS TUBING SEVERING MACHINE
Finley B. Hess, Brockway, and George B. Erskine, Emporium, Pa., assignors to Brockway Glass Company, Brockway, Pa.
Filed Dec. 13, 1963, Ser. No. 330,361
10 Claims. (Cl. 82—51)

The present invention relates generally to automatic machinery for use in glass and related industries and in particular to an improved machine for automatically severing sections of predetermined linear dimensions from a supply of elongated thermoplastic tubing.

In the manufacture of glass bottles, one preferred method of manufacture comprises the steps of severing sections of cylindrical glass tubing from an elongated length of glass tubing and subsequently forming the ends of each section into a base and top respectively of a finished glass bottle. In order to comply with the modern requirements for high speed mass production and uniformity in end result, it is desirable to provide means to perform the individual operations of this manufacturing process quickly, inexpensively, and with a relatively high order of precision. For example, it is desirable to provide means for the easy storage of a plurality of lengths of tubing which are to be severed into sections, to provide means to feed the lengths of such tubing, one at a time, to a mechanism which will perform the severing operation, to provide means which will quickly and efficiently, but at the same time accurately, sever individal sections of desired dimensions from the length of tubing, and to provide further means to orient or transport the severed sections such that the further manufacturing processes may be performed. Superimposed upon all of this is the overriding desirability of providing means to perform these steps with an absolute minimum of wasted time between successive operations. It must be appreciated that while one second, or even a fraction of a second, is not much time to lose, the cumulative loss of one second for each item produced, when there are thousands of individual items, becomes significant. This cumulative loss of time should be minimized in a manufacturing operation as contemplated in the present invention.

It is within the contemplation of the present invention to provide an automatic machine for severing sections of tubing from elongated lengths of tubing which functions according to the aforestated desirable operational characteristics. In the co-pending application entitled Glass Cutting Machine, Serial No. 67,278, filed November 4, 1960, Patent No. 3,156,390, there is disclosed a machine of generally similar nature which is the precursor of the machine according to the present invention.

It is the object of the present invention to provide an automatic production machine for the fast but yet accurate severing of lengths of elongated tubing into discrete sections. It is a further object of the present invention to provide within such a machine means for storing a plurality of lengths of tubing to be fed continuously, but one at a time, to further operative portions of the machine.

It is still further within the contemplation of the present invention to provide such a machine wherein time lags between successive operations are reduced to a minimum thereby to produce an end product in a minimum unit time.

It is still further within the object of the present invention to provide integrated means for storing, feeding, cutting and transporting glass material for the mass production of glass bottles.

In accordance with one presently preferred embodiment of the invention, there is provided a machine for cutting elongated lengths of thermoplastic tubing into a plurality of individual sections of predetermined length. The machine comprises an inclined hopper for storing the plurality of lengths of tubing in association with means which define a feed path adjacent to the supply hopper. Controlled feed means are provided between the hopper and the feed path to feed individual lengths of tubing to the feed path at the appropriate time. Advancement means are operatively positioned adjacent the feed path for advancing the length of tubing along the feed path to a severing line and a short distance beyond the severing line such that the rough ends may be trimmed therefrom. Detection means are provided adjacent the severing line to detect the absence of a length of tubing in the feed path, which detection means then effectively triggers the feed means to supply a length of tubing from the hopper to the feed path. A rotating wheel is provided adjacent the severing line to rotate the length of tubing about is axis and a serving tool and work-heating means are further provided to function in time relationship to heat the length of tubing at the severing line and to sever same. A pulse advancement wheel is mounted along the feed path and is operable to advance a length of tubing a short distance beyond the severing line, after the severing operation has been performed, and a pair of advancement fingers, axially movable along the feed path, are provided to grasp the cut end of a length of tubing and move the tubing along the feed path during advancement stroke such that the cut end of the tubing is brought to a positioning location. Stop means are provided at the positioning location and include a tubing contact member which, after the tubing has been positioned, is withdrawn from engagement with the tubing. Drive means are provided to actuate the various mechanisms and included within the drive means are provisions to produce relatively rapid motion during some portions of the cycle and slower motions during other portions thereof to thereby speed up the overall operation. Control means are provided to operate the mechanisms in a timed cyclical order to feed a length of tubing from the supply hopper to a transfer location, to advance a length of tubing beyond the severing line, to sever a trimming section from the forward end of the tubing, to further advance the length of tubing to a locating position, to sever a section of the desired length from the tubing and the repeatedly advance the tubing and sever sections therefrom in timed cyclical order.

The foregoing brief description, as well as further objects, features and advantages of the present invention, will be best understood and appreciated by reference to the following detailed description of one presently preferred embodiment of the invention when considered in conjunction with the accompanying drawings wherein:

FIGS. 1A and 2A constitute a front elevational view of a tubing storage and severing machine according to the present invention wherein FIG. 1A forms the lefthand portion of the elevational view and FIG. 1B forms the righthand portion thereof;

FIGS. 2A and 2B constitute a plan view of the machine according to the present invention with portions broken away for purposes of clarity; FIG. 2A comprises the lefthand portion of the plan view and FIG. 2B comprises the righthand portion thereof, it being noted that FIG. 2B is in a larger scale than FIG. 2A to more clearly disclose the various components of the device;

FIG. 11 is an axial and sectional view of the stop mechanism employed in the device;

FIG. 12 is an enlarged and partially sectioned view of the main crank connecting arm which is illustrated in FIGS. 2A and 3;

FIG. 15 illustrates the detection of an absence of a glass tube in the feed path and the delivery of a length of tubing from the transfer location to the feed path;

FIG. 16 illustrates the deposit of a further length of tubing to the transfer location and the initial transport of the new length of tubing to a position wherein its forward edge projects slightly beyond the severing line;

FIG. 17 illustrates the severing of a trimming section from the forward end of the new length of tubing and further illustrates the proper longitudinal positioning of a subsequent length of tubing at the transfer location;

FIG. 18 illustrates the movement of the advancement fingers during their pickup stroke toward the severing line and the retraction of the burner, the rotating roller and the severing wheel from the feed path;

Figure 19:
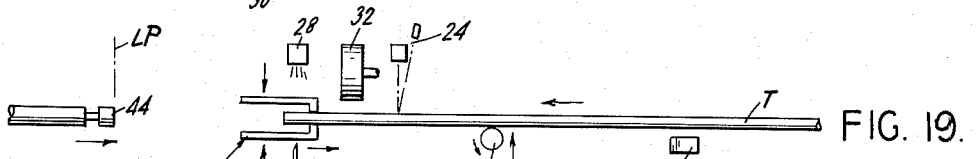
Figure 20:
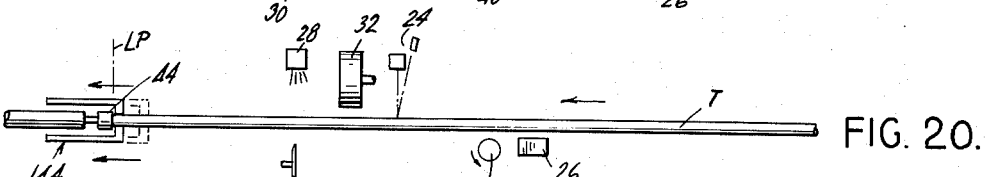
Figure 21:
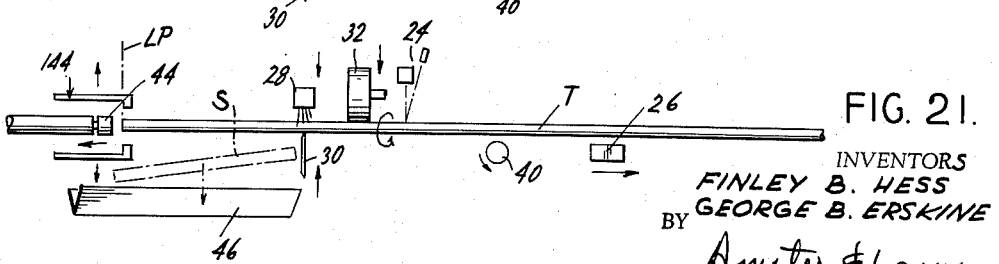

FIG. 19 schematically illustrates the advancement pulse given to a length of tubing by the pulse roller, and the engagement of the advancement fingers with the forward end of a length of tubing and further illustrates the extension of the work contacting member of the stop into its locating position;

FIG. 20 illustrates the advancement stroke of the advancement fingers bringing the length of tubing to the locating position; and FIG. 21 illustrates the retraction of the work contacting member of the stop, the opening of the advancement fingers, the rotation of the tubing by the rotating wheel, the operative engagement of the burner and the severing wheel with the length of tubing at the severing line and, in phantom, receipt of a severed action of tubing into the transfer cradle.

Figure 14:
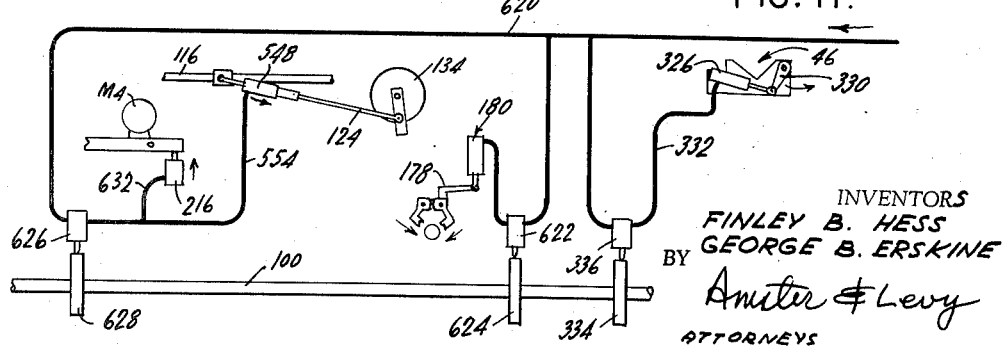
FIG. 14 is a schematic view of the pneumatic control elements for the various pneumatically operated devices incorporated within the machine.
Figure 15:
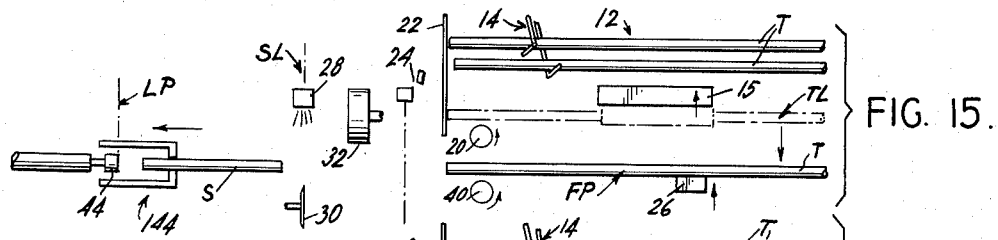
FIGS. 15 through 21 are diagrammatical representations of the manufacturing operations performed by the illustrated machine. Specifically.

Prior to making reference to FIGS. 1 through 14 for a specific description of the various elements in the machine according to the present invention, reference is made to the disclosures of FIGS. 15 through 21 to diagrammatically illustrate the manufacturing process and the principal operative elements of the machine which incorporates features of the invention. The glass cutting machine, generally designated by the numeral 10, includes at one end a supply hopper 12 which is of a size and shape adapted to accommodate a plurality of elongated lengths of glass tubing T. Feed means 14, including feed arms 16, 18, are positioned in association with the supply hopper 12 to feed lengths of tubing T, one at a time, to a transfer location designated in the drawings as TL. The transfer location is defined by a blocking gate 15 which blocks the passage of lengths of tubing T from the feed means 14 to the feed path FP. A positioning roller 20 is located underneath the transfer location TL and periodically engages a length of tubing at the transfer location to drive the same toward the end of the supply hopper closest to the severing mechanisms. An alignment member 22 is positioned perpendicular to the feed path FP to provide a positioning stop against which the lengths of tubing T are located in an axial direction within the transfer location TL. The blocking gate 15 is movable vertically to permit a length of tubing T to move, by gravity, from the transfer location TL into the feed path FP as indicated by the arrow in FIG. 15. In FIG. 15 the blocking gate 15 is shown in dotted configuration in its blocking position and in full line configuration in its raised position. An electric eye unit 24 is positioned adjacent the feed path and adjacent the severing line, as described below, and is operative to register the presence or absence of a length of tubing T within the feed path FP. As illustrated diagrammatically in FIGS. 15 and 16, a beam of light is directed into the feed path FP and, if it strikes a length of tubing T, the beam is reflected to the photoelectric cell of the unit 24. Conversely, if there is on length of tubing T within the feed path, the beam of light is not reflected and the photoelectric cell effectively triggers the raising of the blocking gate 15 such that a new length of tubing T is fed into the feed path EP.

Figure 16:
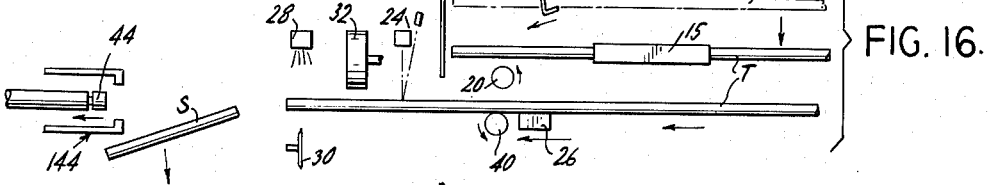
Figure 17:
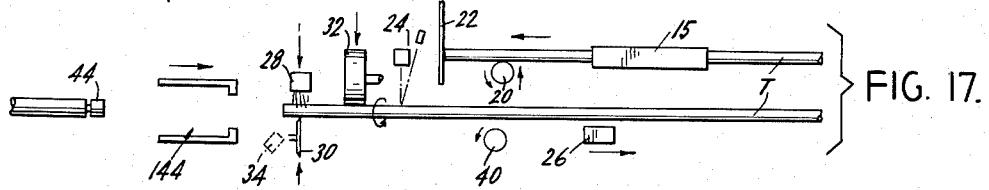

Immediately after a new length of tubing T is allowed to fall into the feed path FP from the transfer location TL, a vacuum transfer device 26 moves into engagement with the new length of tubing T, as indicated by the arrow in FIG. 15, and, as indicated in FIG. 16, then moves toward the left, transporting the tubing T toward and slightly beyond the severing line SL. At the severing line SL there is located a gas burner 28 and a severing wheel 30. The travel of the vacuum transfer device 26 is carefully limited to be slightly greater than the linear distance between the alignment member 22 and the severing line SL. Accordingly, approximately 1½ inches of the forward end of the tubing extends beyond the severing line SL and removed in a trim-cut as illustrated in FIG. 17. Still referring to FIG. 16, it is shown that the light beam of the photoelectric cell 24 intersects the glass tubing T and is reflected back to the unit 24 such that the next successive length of tubing T is held at the transfer location TL by the blocking gate 15.

Now referring to FIG. 17, it is seen that a tubing rotating wheel 32 is moved into engagement with the tubing T within the feed path FP to rotate the tubing about its own axis. The burner 28 is moved into operative relationship with the tubing T at the severing line SL to heat the tubing preparatory to the severing operation and, after sufficient heat is introduced, the severing wheel 30 is moved into engagement to remove a trimming section 34 as indicated in the dotted configuration of FIG. 17. At the same time as this trim-cut operation, the positioning roller 20 is moved into engagement with the next successive length of tubing T at the transfer location TL to position same accurately against the alignment member 22. In addition, the vacuum transfer device 26 is moved toward the righthand end of the machine to be in proper position to perform the trim-cut transfer for the next successive length of tubing. Still furthermore, it may be seen in the lefthand portion of FIG. 17 that a pair of advancement fingers 36, 38 are moved from the lefthand end of the machine toward the severing line SL to be in proper position to grasp the length of tubing T to draw same across the severing line in preparation for the severing operation.

Figure 18:
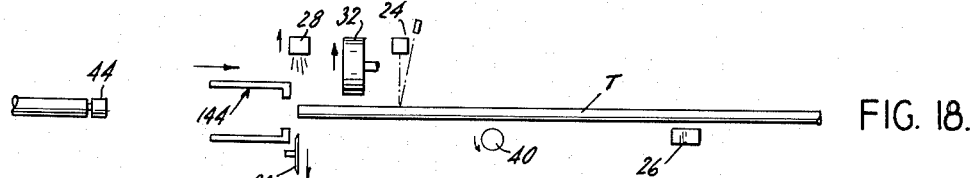

In FIG. 18 the advancement fingers 36, 38 have been moved still closer to the severing line SL. The burner 28, the severing wheel 30 and the tubing rotating wheel 32 have all been moved outwardly from the feed path FP. Accordingly, the various elements are in a position to advance the tubing T and to sever a section therefrom. The relationship of the various elements illustrated in FIG. 18 will be the same for each successive section of tubing to be severed from the length of tubing T whether the previous cut has been a trim-cut as shown in FIG. 17 or has been a cut of the end product as will be described below.

Advancement of the length of tubing T toward the left is accomplished by the movement of the advancement fingers 36, 38 to the limits of their pickup stroke at which time the fingers 36, 38 are moved toward each other grasping the forward end of the length of tubing therebetween. In order to insure that the fingers 36, 38 will properly grasp the length of tubing T, a pulse advancing roller 40 is moved into contact with the length of tubing T to give it a slight movement toward the left, beyond the severing line SL. The advancement fingers 36, 38, now in gripping engagement with the forward end of the length of tubing T, are moved through their work advancement stroke to transport the length of tubing T into engagement with a stop mechanism 42 and, in particular, into engagement with the tubing-contacting body 44 of the stop mechanism 42.

The distance between the material contacting body 44 and the severing line SL exactly corresponds to the desired length of the section S of glass tubing to be cut off from the length of tubing T. As indicated in FIG. 20, a slight slippage of the advancement fingers 36, 38 occurs at the end of the work advancement stroke thus assuring a firm and accurate contact of the forward end of the tubing T against the stop 42 and preventing any bounce-back of the tubing T as it engages the stop. Since the length of the work advancement stroke of the fingers 36, 38 is selectively set to be equal to the length of the section S of tubing to be cut by the machine, the amount of slippage of the advancement fingers 36, 38 corresponds to the amount of advancement imparted to the length of tubing T by the pulse advancing roller 40. It should be noted that during the work advancement stroke of the advancement fingers 36, 38 the vacuum transfer device 26 is moved through its advancement stroke, however, it is not operatively engaged with the tubing T.

With the forward end of the tubing T engaged against the stop mechanism 42, the various elements are in position to form the severing operations to produce the desired section of tubing. To accomplish this, the advancement fingers 36, 38 are spread apart (see FIG. 21), the tubing contacting member 44 is retracted from the locating position LP and the tubing rotating roller 32 is brought into engagement with the tubing T to rotate same about its own axis. The burner 28 is then operatively engaged with the tubing T as it is rotated and the severing roller 30 is then brought into engagement with the periphery of the tubing at the severing lines SL to sever the desired section of tubing. The section S of tubing severed from the length of tubing T is illustrated in broken line configuration in FIG. 21.

Upon the severing of the section S from the length of tubing T, the various mechanisms are returned to the positions illustrated in FIG. 18 wherein the advancement fingers 36, 38 are moved through their pick-up stroke, the burner 28, severing roller 30 and tubing rotating roller 32 are removed from the feed path FP and the cyclical advancement and severing operations as described above are repeated. When the end of the given length or tubing T is reached, the photoelectric cell 24 registers the absence of a length of tubing in the feed path FP and a new length of tubing is allowed to pass the blocking gate 15 and enter the feed path FP as shown in FIG. 15. It should be noted that in FIG. 15, the advancement fingers 36, 38 are illustrated going through their tubing advancement stroke transporting the end of a completely severed length of tubing T. In normal operations, when the forward end of the tubing T contacts the tubing contacting member 44 of the stop mechanism 42, the usual cyclical operations of the machine would be effective to sever a section S from the length of tubing. However, since there is no more tubing to be severed, as soon as the advancement finger 36, 38 opens, the tubing is dropped downwardly and is rejected. This rejection operation occurs simply because the transfer cradle 46 is not moved into position below the feed path until the severing operation is commenced. Therefore, rather than progressing through the severing of a complete section S of tubing, the mechanism operates to perform the trimming operation as described in FIGS. 16 and 17 above.

Figure 1B:
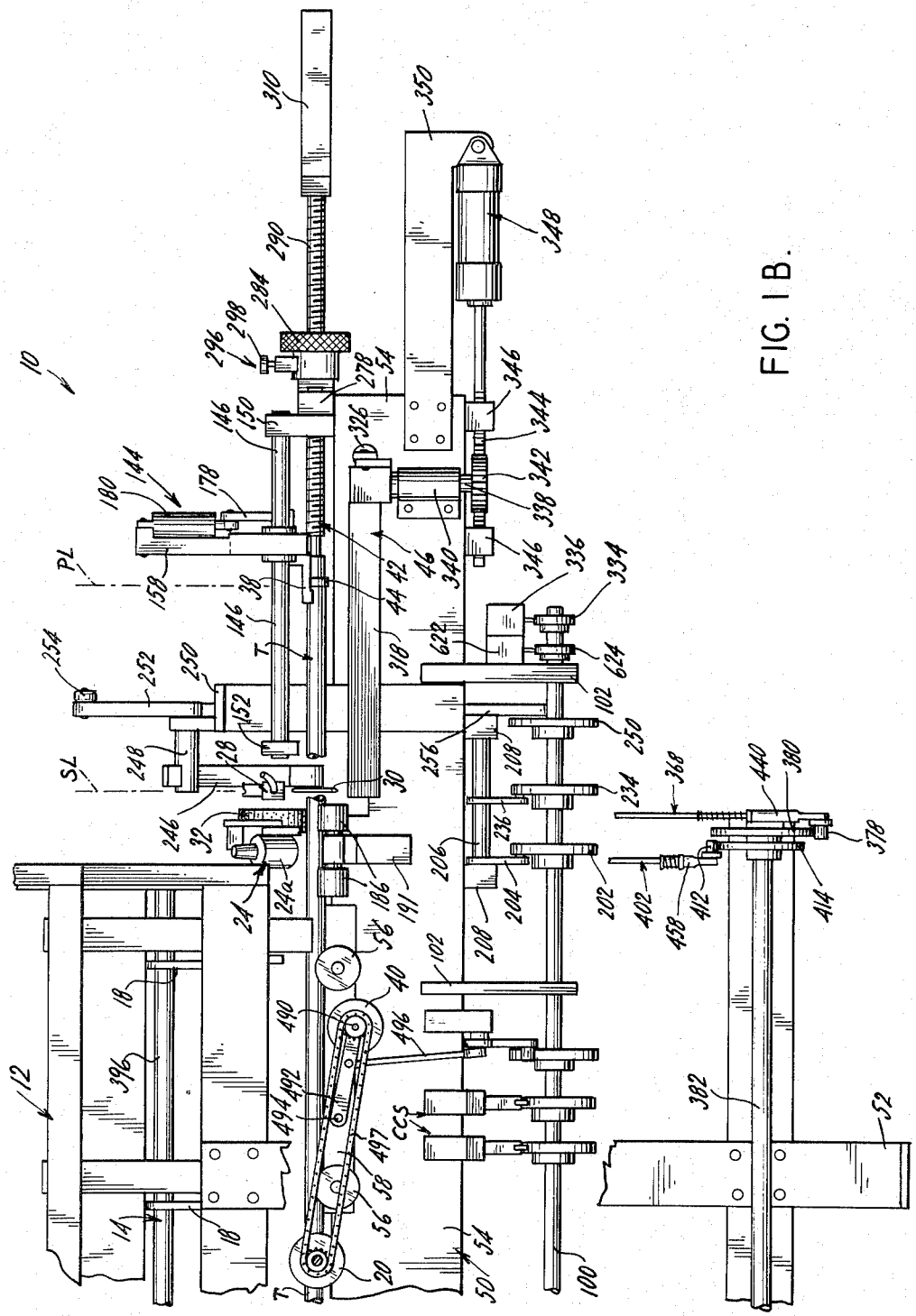

Reference will be now made to FIGS. 1 to 14 for a complete description of the various operative elements of the glass tubing severing machine 10 according to the present invention. The machine 10 is constructed upon a frame, generally designated by the numeral 50, which includes a plurality of support legs 52. As seen in FIG. 1A, a main support 54, which runs longitudinally of the machine 10, is mounted on the legs 52. Most of the operative elements of the machine 10 find their structural support on the main support 54. As generally indicated in the description above of the schematic drawings of FIGS. 15 through 21, a supply hopper 12 is located at the supply end of the machine 10, which is the lefthand end in FIGS. 1A and 1B. Material is fed from the supply hopper 12 to a feed path FP which is defined by various guiding members and is transferred down the length of the feed path from the supply end of the machine to the output end by appropriate mechanisms. A severing line SL is defined at a location along the length of the feed path FP by a severing wheel 30 and a positioning location PL is defined by the location of the tubing contacting member 44 of the stop mechanism 42.

Description of the various structural elements in the machine 10 will proceed with the description of the means which define the feed path, the various elements which advance and locate the tubing T along the feed path and the severing transfer means. Description of the supply hopper 12 and its associated material feed mechanisms will be given after the following description of the other portions of the machine 10.

The feed path FP is defined by a series of aligned V-shaped rollers 56 which are supported by the main support 54 and mounted for rotation about their own axis by appropriate bearing and shaft means. The shafts for the rollers 56 are secured to roller brackets 58, 60 which in turn are mounted on the main support 54 by appropriate attachment brackets. When a length of tubing is released from the blocking gate 14 it rolls downwardly down the inclined surface 35б of the supply hopper 12 onto the rollers 56 and onto the feed path FP (see FIG. 4).

The vacuum transfer device 26 (see FIGS. 1A and 2A) comprises a vacuum head 62 having appropriate air intake holes 64 which is mounted on a transfer carriage 66 for movement parallel to the feed path FP. Guide rails 68, 70 are supported on the frame 50 on a pair of support brackets 72 secured directly to the main support 54. Appropriate bearing openings are formed in the blocks 66 mounting same on the guide rails 68 for smooth movement through a trim advancement stroke and a return stroke under the impetus of the vacuum advance crank 74 and the associated connecting rod 76. The vacuum head 62 is pivotally supported on the carriage 66 immediately below the feed path FP by means of a bracket 78 and an associated pivot pin 80 such that the head 62 may be moved into and out of contact with a length of tubing T positioned within the feed path FP. A vacuum engaging piston and cylinder assembly 82 is pivotally connected at one end to the vacuum head 62 and at its other end to the carriage 66 at a point removed from the pivot 80 such that upon delivery of air pressure through the air pressure tubing 84 the piston and cylinder assembly 82 will become elongated thus swinging the vacuum head 62 operatively into engagement with the glass tubing T. The vacuum hose 86 is connected to the vacuum head 62 to supply the required vacuum.

The vacuum transfer device 26 is driven along the guide rails 68, 70 through its trim-cut feeding stroke by a main motor M-1 (see FIG. 1A) which is connected by appropriate means to a gear reduction unit 88. The gear reduction unit 88 is connected through a link chain 90 to an appropriate pulley on the shaft 92, a further link chain 94 interconnects the shaft 92 with an appropriate pulley and shaft driving a bevelled gear 96. The bevelled gear 96 mates with a complementary bevel gear 98 which is rigidly secured to the main cam shaft 100 of the machine 10. As may be seen best in FIGS. 1A and 1B, the main cam shaft is mounted on the frame 50 within appropriate bearings in the bearing brackets 102. The cam shaft 100 is rotated 360° for each cycle of operation of the machine 10. A Geneva wheel drive member 104, having two opposed driving arms 106, 108 is rigidly secured to the shaft 94 and is operatively engaged with a driven Geneva wheel driven member 110. The drive member 104 effectively drives the driven member 110 through two pulsed rotational advances, as is the function of the Geneva wheel constructions, to total a 180° movement of the driven Geneva wheel 110 during each complete rotation of the driving member 104, i.e., during each cycle of operation of the machine 10. An external gear 112 is rigidly secured to the driven Geneva wheel 110 and is operatively engaged with a further gear 113 which in turn is rigidly and concentrically secured to the vacuum advance crank arm 74. Due to the two-to-one relationship between the gear 112 and the gear 114, the vacuum advance crank arm is rotated 360° for each cycle of operation of the machine 10 through two rapid 180° movements with a pause period at each end of the movement in accordance with the normal characteristics of Geneva wheel constructions. Thus, the vacuum transfer device 26 is moved quickly through its advanced stroke at the beginning of a cycle of operation and is then quickly returned to its position closest to the supply end of the machine during the latter portion of a cycle of operation.

Reference will now be made to FIGS. 2A, 2B, 3, 8 and 9 for a description of the work advancement mechanisms and their drive means. First referring to FIGS. 2A, 2B and 3 for a description of the drive mechanisms, it is seen that an advancement rod 116 is secured for transverse movement to the main support member 54 by a number of bearing slide blocks 118. At the output end of the machine 10, means are provided interconnecting the advancement fingers 36, 38 to the advancement rod 118 to advance the fingers during manufacturing operations. These structures will be described below. At the supply end of the machine 10, a connecting block 120 is secured to the advancement rod 116 by conventional means and has pivotally connected thereto, at pivot 122, an advancement connecting rod generally designated by the numeral 124. At its other end, the advancement connecting rod 124 is pivotally connected, at pivot 126, to an adjustable work advancement crank generally designated by the numeral 128. The work advancement crank 128 is driven from a shaft interconnecting the vacuum advance crank 74 and a chain link pulley 130 which in turn is connected through a link chain 132 and a link chain pulley 134 to the work advancement crank 128. The adjustable work advancement crank 128 comprises a bifurcated block 136 secured to the pulley 134 and rotatable therewith. The block 136 has mounted for axial rotation therein a screw 138 with an adjustment knob or head 140 protruding outwardly from the block 136. An internally threaded slider 142 is mounted within the bifurcated arms of the block 136 and is engaged with the threaded member 138 such that the radial distance of the slider 142 with respect to the center of the pulley 134 may be varied by turning the screw 138. Specifically, if a long stroke is desired to be imparted to the advancement rod 116, the screw 138 is turned in a counterclockwise direction to move the slider 142 toward the outer end of the block 138 thus increasing the effective radius of the adjustable crank 128. Conversely, a shorter stroke can be formed by turning the screw 138 in a clockwise direction. It will be appreciated that the crank 128 and therefore the advancement rod 116 will be reciprocated from the supply end of the machine toward the output end of the machine and back again once during each cycle of operations and that the motion will be of intermittent characteristics as governed by the output of the Geneva wheel arrangement 104, 110. In addition to the non linearity of motion introduced by the Geneva wheel arrangement, the connecting rod 124 is provided with internal mechanisms to elongate and shorten the length of the connecting rod during operations to selectively speed up and slow down movement of the advancement rod 116 at selected moments during the cycle of operation. The structure and functioning of these elements will be described in detail below.

The work advancement mechanisms comprise means to mount the work advancement fingers 36, 38 for relative movement toward and away from each other thereby to grasp a length of tubing and means to move the fingers in unison through a pick-up stroke from the output end of the machine towards the supply end and through an advancement stroke to draw a length of tubing T across the severing line SL and to locate the forward end of the tubing at the locating position LP against the tubing contacting member 44 of the stop mechanism 42. The work advancement assembly 144 (see FIGS. 1B and 2B) is mounted on a pair of slide rods 146, 148 which are mounted upon the frame 50 by means of support brackets 150, 152. A carriage body 154 is provided with a pair of spaced slide rod-receiving slide bearings 156, 158 which mount the carriage 154 for linear movement on the slide rods 146, 148. A carriage arm 160 extends outwardly from the carriage 154 into engagement with the advancement rod 116 and is rigidly secured thereto by means of the adjustment screws or bolts 162 in engagement with a locking plate 164 (see FIG. 8) thus mechanically linking linear motion of the advancement rod 116 with the carriage 154.

Figure 9:
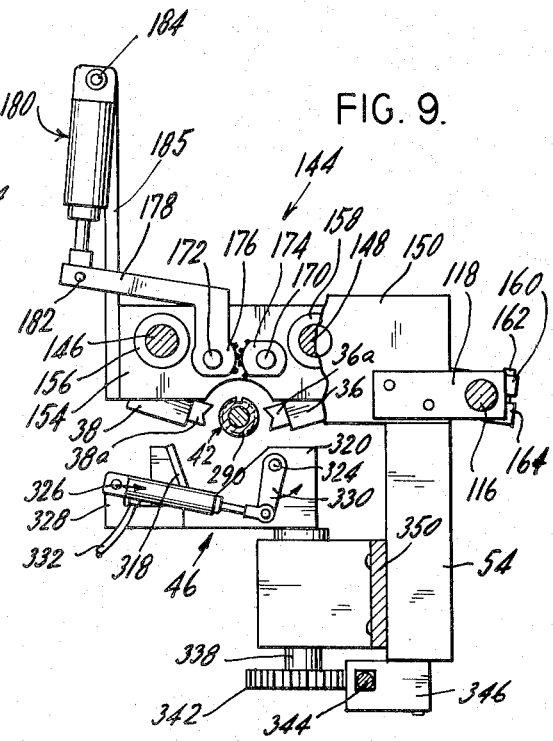
FIG. 9 is a sectional view taken along the line 9—9 of FIG. 2B and looking in the direction of the arrows further illustrating the constructions shown in FIG. 8.

The advancement fingers 36, 38 are mounted on a pair of angled pivot arms 166, 168 which are secured at pivots 170, 172 to the carriage body 154. Upon rotation of the arms 166, 168 in opposite directions, the fingers 36, 38 are moved towards or away from each other. Each of the fingers 36, 38 is formed with a V-shaped tubing contacting tip 36a, 38a respectively and the various elements are sized and oriented such that the V-shaped tips 36a, 38a exactly correspond to the location of a length of tubing T when positioned within the feed path FP. As best seen in FIG. 9, the pivot pins 170, 172 extend through the carriage body 154 to the side opposite from the fingers 36, 38 and are engaged with a pair of mating pinion gears 174, 176 which function to link the movement of one of the arms 166, 168 to the movement in the opposite direction of the other arm. An L-shaped extension 178 is rigidly secured to the gear 176 and extends upwardly and sidewardly therefrom to provide actuating means to open and close the advancement fingers 36, 38. A piston and cylinder assembly 180 is pivotally secured at one of its ends at 182 to the arm 178 and at pivot point 184 at its other end to an upstanding support bracket 185. The support bracket 186 is in turn rigidly secured to the carriage body 154. Upon the introduction of air pressure into the piston and cylinder assembly 180, that assembly expands thus rotating the gears 174, 176 and therefore the pivot pin 170, 172 to cause inward engaging movement to the tubing contacting ends 36a, 38a of the advancement fingers 36, 38. Conversely, when air pressure is removed from the piston and cylinder assembly 180, the fingers 36, 38 move away from each other releasing a length of tubing T held therebetween. As will be explained in detail below, the piston and cylinder assembly 180 is activated to move the fingers 36, 38 into gripping relationship when the carriage 154 is advanced to the end of its pick-up stroke such that the fingers will grasp the forward end of the length of glass tubing T to hold the tubing during advancement stroke of the carriage 154.

Description will now be made of the various operating elements at or in the vicinity of the severing line SL with particular attention being made to FIGS. 1B, 2B, 5, 6 and 7.

Figure 5:
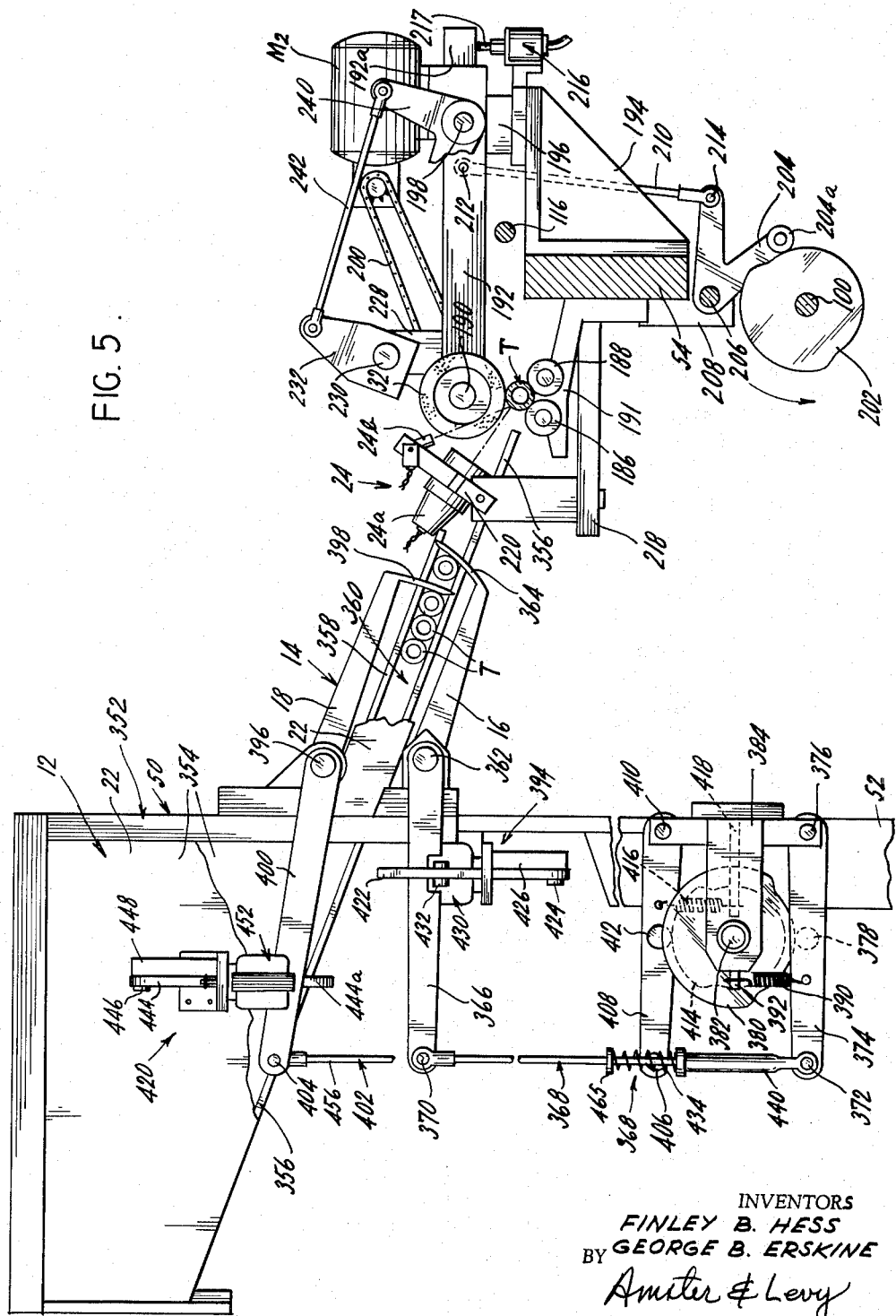
FIG. 5 is a sectional view taken along the line 5—5 of FIG. 2B looking in the direction of the arrows and illustrating the feeding devices within the supply hopper and further illustrating the glass detecting means and tubing roller means adjacent the severing line.

As best seen in FIG. 5, a length of tubing T within the feed path FP is supported by two pairs of support rollers 186, 188 underneath and on either side of feed path FP. The rollers 186, 188 are mounted for rotation about their own axes and are supported on a roller bracket 191 which is secured to the main support 54. Immediately prior to the severing operation at the severing line SL, the tubing rotating wheel 32 is lowered into contact with the length of tubing T, while it is resting upon the wheels 186, 188. The rotating roller 32 is mounted by a shaft 190 on a pivotally mounted arm or beam 192 which in turn is pivotally secured to the main frame 54 by a bracket 194 and a pivot support 196. The beam 192 is pivoted on a shaft 198 which in turn is secured to the pivot support 196. Rigidly secured to the beam 192 is a roller motor M-2 whose output, through an appropriate gear reduction unit, is linked to the tubing rotating wheel 32 by a link chain 200. At the proper point in the operating cycle of the machine 10, and with the motor M-2 driving the tubing rotating wheel 32, the beam 192 is lowered to bring the roller 32 into engagement with a length of tubing T. This movement is actuated and controlled by a cam 202 mounted on the main cam shaft 100 which is connected to the beam 192 by a double arm follower 204 pivotally mounted on the support 54 at pivot point 206 on a bracket 208 and by an appropriate connecting rod 210. The connecting rod is secured to the beam 192 at a pivot point 212 and to the follower 204 at a pivot 214. A roller follower 204a is engaged against the cam 202 such that when a low point of the cam is reached, the beam 192 and the rotating roller 32 is lowered into engagement with the length of tubing T and when a high point is reached, the roller 32 is lifted out of the feed path FP. In addition to the cam control, an air piston assembly 216 is appropriately mounted on the outward end of the bracket 194 and is provided with a plunger 217 which is engageable with an extension 192a of the beam 192. Delivery of air pressure to the assembly 216 pushes the plunger 217 outwardly into engagement with the extension 192a of the beam 192 and serves to positively maintain engagement between the tubing rotating roller 32 and a length of tubing T.

At approximately the same location as the tubing rotating roller 32, there is mounted the photoelectric eye unit 24 which is supported upon an L-shaped bracket 218 secured to the main support 54. The electric eye unit 24 includes a light source 24a, appropriate wiring mounted upon a bracket 220 and a photosensitive detector 24b. As shown in FIG. 5, the light 24a is directed downwardly into the feed path FP and the reflected beam from a length of tubing is received by the photosensitive unit 24b. Upon the failure of the unit 24b to detect the reflected light beam, the tubing supply means are triggered to release another length of tubing T from the transfer location TL into the feed path FP.

Figure 6:
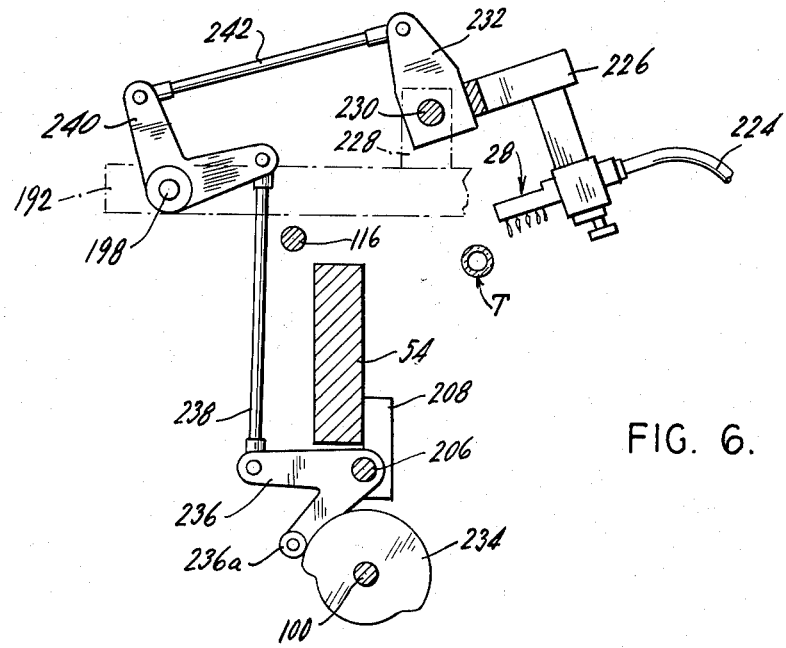
FIG. 6 is a sectional view taken along the line 6—6 of FIG. 2B looking in the direction of the arrows and illustrating the construction and mounting arrangements for the tubing burner.

The burner 28, which is utilized to heat the periphery of the tubing T immediately prior to the engagement of the severing wheel 30 therewith, is mounted for movement into and out of operative engagement with the feed path FP by means best illustrated in FIGS. 5, 6 and 2B. The burner 28 comprises a conventional gas burner served by a gas supply tube 224 and mounted upon an L-shaped bracket 226. The base of the bracket 226 (seen in FIG. 2B) is bifurcated and its two arms extend on either side of a mounting block 228 on the pivot beam 192 such that the burner 28 may pivot about the pivot pin 230 into and out of engagement with a length of tubing T within the feed path FP. A crank arm 232 extends upwardly from one of the bifurcated arms of the bracket 226 and is rigidly secured thereto such that movement of the crank arm 232 will swing the burner B about the pivot shaft 230. This motion is actuated at the proper time in the machine cycle by the rotation of the cam 234 on a main cam shaft 100 to move the double arm follower lever 236, the connecting rod 238, the bell crank lever 240 pivotally mounted on the rotating roller mounting arm 192 at pivot 198, and the connecting rod 242 connected at one end to the bell crank lever 240 and at the other end to the crank arm 232. As will be readily appreciated from studying this linkage arrangement as shown in FIG. 6, when the follower roller 236a of the follower 236 is engaged with a high point of the cam 234, the burner 28 will be withdrawn from the feed path FP and, conversely, when a low point of the cam is engaged by the follower 236a, the burner 28 will be swung into engagement with a length of tubing T within the feed path FP.

Figure 7:
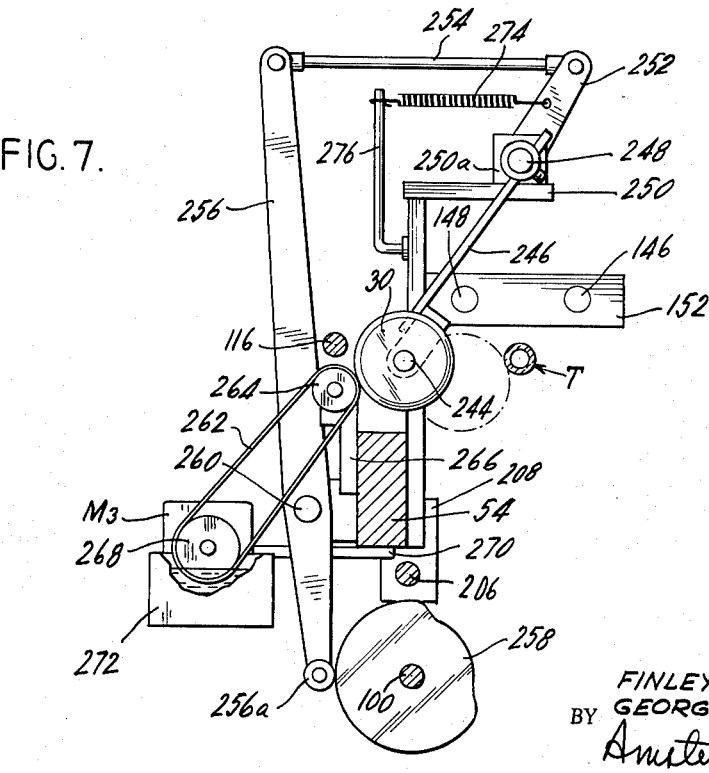
FIG. 7 is a sectional view taken along the line 7—7 of FIG. 2B and looking in the direction of the arrows illustrating the severing mechanisms located at and adjacent the severing line.
Figure 8:
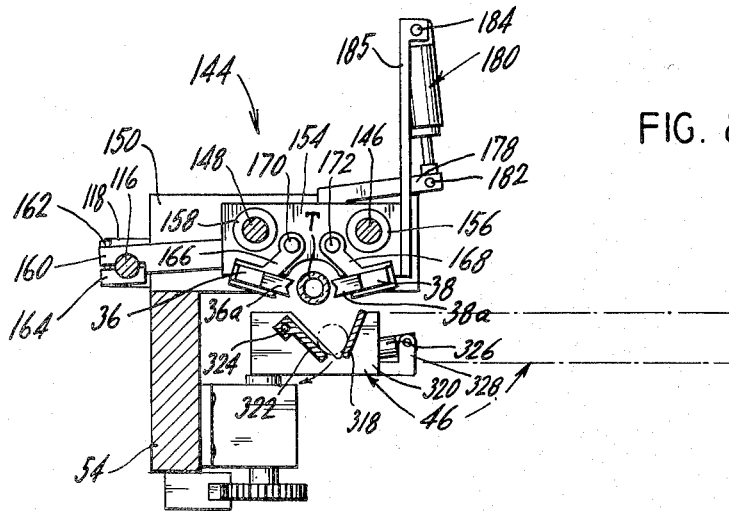
FIG. 8 is a sectional view taken along the line 8—8 of FIG. 2B and looking in the direction of the arrows illustrating the construction and operation of the tubing advancement fingers and the tubing section cradle.

The severing wheel 30 (see FIG. 7) is mounted exactly on the severing line SL, and in fact defines the location of the severing line SL. The severing wheel 30 is a disk-like object of metal or other firm material and has a sharp profile edge. The wheel is mounted upon an axle 244 which is supported on a swinging arm 246 which in turn is mounted about a pivot shaft 248. The shaft 248 is mounted for rotation within a bearing block 250a of an inverted L-shape bracket which in turn is secured to the main support beam 254 as indicated in FIG. 7. Also secured to the axle 248 is a crank arm 252 which is actuated, through a connecting rod 254 and an elongated double-arm follower lever 256, by a control cam 258 mounted upon the main cam shaft 100. Specifically, when the follower roller 256a is engaged against a low point on the cam 258, the follower lever 256a pivots in a counterclockwise direction about its pivotal mount 260, causing a similar clockwise pivotal movement of the crank arm 252. The severing wheel mounting arm 246 is then caused to rotate in a counterclockwise direction thus swinging the severing wheel 30 from the position shown in full lines in FIG. 7, into the position shown in dotted line, i.e., into engagement with the periphery of a length of tubing T located within the feed path FP at the severing line SL. Upon continued rotation of the control cam 258, the follower 256a engages a high point of the cam causing rotation of the follower lever 256, the crank arm 252 and the mounting arm 246 in a clockwise direction to swing the severing wheel 30 away from the feed path FP into the position shown in FIG. 7. In the retracted position of the severing roller 30, the periphery of the roller is engaged against a water belt 262 at the belt pulley 264. The belt pulley 264 is appropriately mounted on a bracket 266 which is secured to the main support beam 54. At its other end the belt 262 is supported about the driving pulley 268 of a belt drive motor M–3 which is supported on the main support beam 54 by the bracket 270. Also supported on the bracket 270 is a water vessel 272. The water belt 262 passes through the water bath within the container 272 as it rotates about the pulleys 264, 268 such that the surface of the belt 262 is constantly wet. The severing roller 30 is not directly driven but is simply journaled for rotaton on its central axis 244. When it is engaged with the belt 262 rotational movement is imparted thereto and, at the same time, water from the bath 272 is applied to the periphery of the roller keeping it both cool and wet. When the cam 258 swings the severing wheel 30 into engagement with the tubing T at the severing line SL, the rate of rotation of the severing wheel 30 is approximately equal to the surface speed of rotation of the tubing such that a rolling contact is effected. The thermal shock imparted to the glass tubing T by the severing wheel 30 is the actual mechanism which causes the severing. Of course, other known means of severing a tubing can equally well be applied within the described machine. It is further noted that crank arm 252 and the severing wheels mounting arm 246 are biased for rotation in the counterclockwise direction, i.e. the direction to engage the severing wheel 30 with the tubing T, by means of a spring 274 interconnected between the crank arm 252 and a spring support rod 276 mounted on the inverted L-shaped bracket 250. The spring 274 governs the pressure with which the severing wheel 30 is applied against the surface of the tubing T during the severing operation.

From the foregoing description it will be appreciated that a length of tubing T within the feed path FP is transported by the vacuum transfer mechanism 26 to the severing line wherein a trim cut is made by the severing wheel 36 and that, on subsequent cycles of the machine, the advancement fingers 36, 38 grasp the forward end of the tubing T and move same a predetermined distance beyond the severing line, to the locating position, governed by the stop mechanisms 42. Reference will now be made to FIGS. 1A, 1B, 2B and 11 for a disclosure of the specific stop mechanism.

The stop mechanism 42 is mounted upon the advancement mechanism bracket 150 at the output end of the machine 10. Specifically, and as best seen in FIGS. 2B and 11, a mounting block 278 is rigidly secured to the bracket 150 by conventional means such as the screws 280. A cut-out 282 is provided in the bracket 150 for the extending portion of the block 278. Mounted for rotation within the block 278 is an adjustment turret 284 which has at its forward end an annular shoulder 286 which is received within a mating annular opening in the block 278 such that the turret 284 may be freely rotated about its own axis with respect to the stationary block 278. A smooth-walled axial bore 288 is formed through the adjustment turret 284 and the block 278 and an elongated stop screw 290 is slidably received therein. The stop screw 290 is provided with a longitudinal keyway 292 which mates with a key 294 received within the block 278 such that the screw 290 may move longitudinally with respect to the block 278, but may not rotate with respect thereto. The linear location of the stop screw 290 with respect to the mounting block 278 is controlled by a positioning assembly 296 which is engageable with the threads on the stop screw 290. Specifically, the positioning assembly 296 includes an adjustment knob and shaft 298 mounted for movement within the turret 284 radially of the screw 290. A threaded block 300 is secured to the shaft 298 and is engaged with the threads on the screw 290. A compression spring 302 is positioned between the block 300 and an internal wall of the turret 302 to maintain the engagement of the block 300 with the scew 290. It will be appreciated that when the block 300 is retracted from the screw 290, as by pulling outwardly on the shaft and knob 298, the screw 290 may be moved axially within the bore 288. Further, with the block 300 engaged against the screw 290, the screw 290 will move axially upon rotation of the adjustment turret 284 about its own axis.

The stop screw 290 is of hollow construction and has positioned therein a rod 304 which has mounted thereon, at one end, the tubing-contacting member 44, the tubing-contacting member is secured to the rod 304 with a ball bearing 306 such that when the tubing T is engaged against the member 44, the member 44 will present no impediment to the rotation of the tubing. The rod 304, at its other end, is connected to the piston and cylinder assembly 308 which is mounted within a cage-like bracket 310 (see FIG. 2B) which is secured to the stop screw 290 by conventional means such as the pins 312. It will be appreciated that upon the delivery of air pressure to the first inlet tubing 314 of the piston and cylinder assembly 308, the rod 304 will be moved axially away from the piston and cylinder assembly 308 to advance the tubing contacting member 44 of the stop mechanism 42 closer to the severing line SL and specifically to the position shown in dotted lines configuration in FIG. 11. Conversely, when air is delivered to the second inlet tubing 316, the piston within the piston cylinder assembly 308 will be driven toward the other end of that assembly retracting the tubing-contacting member 44 to the solid line position of FIG. 11. The movement of the tubing-contacting member 44 from the positioning location shown in dotted lines in FIG. 11 to the retracted position is controlled by means of cam operated switches and valves which will be described in detail below. It should be appreciated that the retraction of the tubing-contacting member 44 from the positioning location is accomplished at approximately that the same time that the tubing rotating roller 32 is brought into engagement with the tubing T such that the member 44 does not interfere with the severing operation.

After the completion of a severing operation, the severed section S of tubing falls downwardly from the feed path and is caught by the transfer cradle 46 which, at the completion of the severing operation, is located immediately below the feed path FP between the severing line SL and the positioning location PL. The transfer cradle 46 may be best seen in FIGS. 1B, 8 and 9. The cradle 46 is of generally V-shaped construction, having one inclined elongated side wall 318 mounted between end walls 320 and a second elongated inclined side wall 322, pivotally supported on the end walls 320 at a pivot hinge 324. Side wall 322 is movable between the closed position illustrated in FIG. 8 and an open position, as shown by the arrow in FIG. 8, such that a section S of tubing may be dropped downwardly out of the cradle. The opening of the side wall 322 is controlled by a piston and cylinder assembly 326 which is mounted at one end on a bracket 328 secured to one of the end walls 320 and is secured at the other end to a crank arm 330 which is rigid with the hinge pin 324. Upon the delivery of air to the piston and cylinder assembly 326 through the air tube 332, the piston and cylinder assembly 326 expands to turn the crank arm 330 into the open position to drop a length of tubing S from the cradle 46. Air pressure to the piston cylinder assembly 326 is controlled by cam 34 on a shaft 100 in turn activates the valve 336 (see FIG. 14).

The cradle 46 is mounted on the main support beam 54 by a pivot shaft 338 secured to the cradle 46 and perpendicular to and received within a bearing sleeve which in turn is secured to the main support beam 54. At the bottom of the pivot shaft 338 there is positioned a pinion 342 which is engaged within a sliding rack 344 to control the angular orientation of the cradle 46. Specifically, the rack 344 is received within slide bearings 346 and is secured to the piston and cylinder assembly 348 which in turn is mounted on a bracket 350 secured to the main support beam 54. Upon movement of the piston and cylinder assembly 348, the rack 344 will be moved to thereby rotate the pinion 342 and the pivot shaft 338 and thereby to swing the cradle 46 about the axis of the shaft 338. A pair of solenoid operated valves, controlled by a cam on the cam shaft 100 and an appropriate switch which will be described below in connection with the description of FIG. 13, control the operations of the piston and cylinder assembly 348. It is sufficient to note that the cradle 46 is located beneath the feed path FP at the end of a severing operations to catch a section S of tubing as it is cut from the length of tubing T, and is then swung outwardly at which time the cradle is opened to deposit the section S of tubing onto a cooperating conveyor system adjacent the machine 10. Thereafter, the cradle 46 is closed and swung back beneath the feed path FP to receive the next successive section S.

Figure 4:
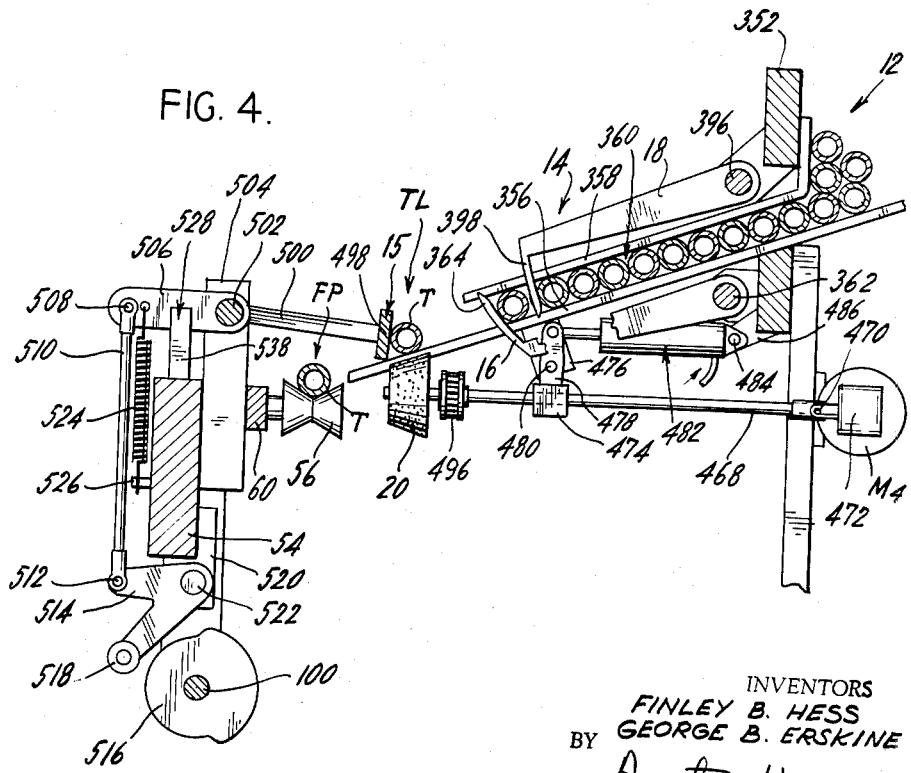
FIG. 4 is a sectional view taken along the line 4—4 of FIG. 2A looking in the direction of the arrows illustrating the hopper supply and feed means.

Description will now be made of the supply hopper 12 and associated feed means which transport lengths of tubing T from the supply hopper 12 to the transfer location TL and then to the feed path FP. These devices are best seen in FIGS. 4 and 5. The supply hopper 12 includes a frame 352 which is secured to the main frame 50 of the machine and in particular to the legs 52 and includes trapezoid-shaped side walls 354. The supply hopper 12 has an inclined bottom wall 356 which extends outwardly beyond the confines of the hopper itself downwardly toward the feed path FP. A secondary inclined guide 358 is parallel to a slightly above the bottom wall 356 to form an elongated hopper exit passage 360 which is of a height such that only one row of lengths of tubing T may exit from the hopper 12. The inclined nature of the hopper 12 is such that all of the length of tubing located therein will, due to the effect of gravity, find their way into the exit passage 360.

Positioned in the exit passage 360, and before the tubing T reaches the blocking gate 15 at the transfer location TL, is the feed means 14 which effectively feeds lengths of tubing T, one at a time, to the transfer location TL and which is activated once for each length of tubing which is severed in the machine 10. The feed means 14 includes the first feed arm 16 and the second feed arm 18. As may be best seen in FIGS. 4, 5 and 10, the first feed arm 16 is pivotally mounted at pivot 362 on the frame 352 of the hopper 12 and is generally parallel to and below the exit path 360. At its end opposite from the pivot 362, the first feed arm 16 is provided with an upstanding extension 364 which protrudes into the exit passage 360 and effectively blocks travel of length of tubing T to the transfer location TL. It will be appreciated that as the arm 16 is swung downwardly, a length of tubing T will be allowed to pass downwardly along the bottom wall 356 to the transfer location TL. This pivotal motion of the arm 16 is controlled by a crank arm 366 which is secured to the pivot shaft 362 and which extends in the direction opposite from the arm 16. A connecting rod 368 is pivoted at pivot point 370 to the arm 366 at one end and at pivot point 372 to a follower arm 374 at the other arm. The follower arm is pivoted to one of the support legs 52 at a follower pivot 376 and has a follower roller 378 in engagement with the lower feed arm control cam 380. The cam 380 is secured to a cam shaft 382 which is mounted on the frame 50 within bearings in the brackets 384 and is driven from the drive shaft 92 through the bevelled gears 386, 388 (see FIG. 2A). The follower arm 374 and the follower roller 378 are held positively against the cam 380 by means of spring 390 secured between the follower arm 374 and a spring mount 392 on one of the bearing brackets 384. When the follower 378 is engaged against the high portion of the cam 380, the feed arm extension 364 will be raised upwardly into the feed passage 360 effectively blocking passage of lengths of tubing T. Conversely, when the follower 378 is engaged against a low portion of the cam 380, the arm 16 will be lowered to allow a length of tubing T to roll downwardly to the transfer location TL. Electro-mechanical blocking and release control means 394 are engaged with the elements described such that the arm 16 is lowered only at the precise moment when a new length of tubing T is to be allowed to pass to the transfer location TL. This mechanism will be described below.

The second feed arm 18 is mounted on its pivot shaft 396 and is provided with a downwardly extending member 398 which projects into the feed passageway 360 at a point upwardly from the extension 364 of the first feed arm 116. The second arm 118 serves to hold the full supply of length of tubing T from falling downwardly out of the supply passageway 360 when the first feed arm 16 is lowered to allow one length of tubing T to exit. Specifically, when the first arm 16 is lowered to allow one length of tubing T roll into the transfer location TL, the second arm 18 is held in its blocking position as shown in FIG. 5; when the first arm 16 is thereafter raised to its blocking position, the second arm 18 is raised to allow one new length of tubing T to move downwardly and to be halted by the first arm 16 and then is again relowered such that its blocking extension 398 separates the lowermost length of tubing T from the remainder such that the cycle may be repeated on the next feeding operation. The second feed arm 118 is controlled through its pivotal motion by an arm 400 rigidly connected to the pivot shaft 396 forming a double arm lever about the pivot 396 comprising the arm 18 and the arm 400. The arm 400 is in turn controlled by a connecting rod 402 which is pivotally connected at its upper end to the arm 400 at the pivot 404 and which is connected at its lower end at pivot 406 to a follower arm 408 which in turn is pivoted to the support frame at pivot 410. Follower roller 412 is engaged with the second feed arm control cam 414 mounted on the shaft 382 and is held in engagement therewith by the tension spring 416 which is secured between the follower arm 408 and a spring mounting bracket 418. It will be appreciated that when the follower 412 is engaged with a high portion of the cam 414, the second feed arm 18 will be in its blocking position and, conversely, when engaged with a low portion of the cam 414, the second feed arm 18 will be raised out of its blocking position. An electromechanical control mechanism 420 is superimposed upon this construction, in engagement with the arm 420 to assure that movement of the second feed arm 18 will occur precisely at the correct moment with respect to movement of the first feed arm 16.

Figure 10:
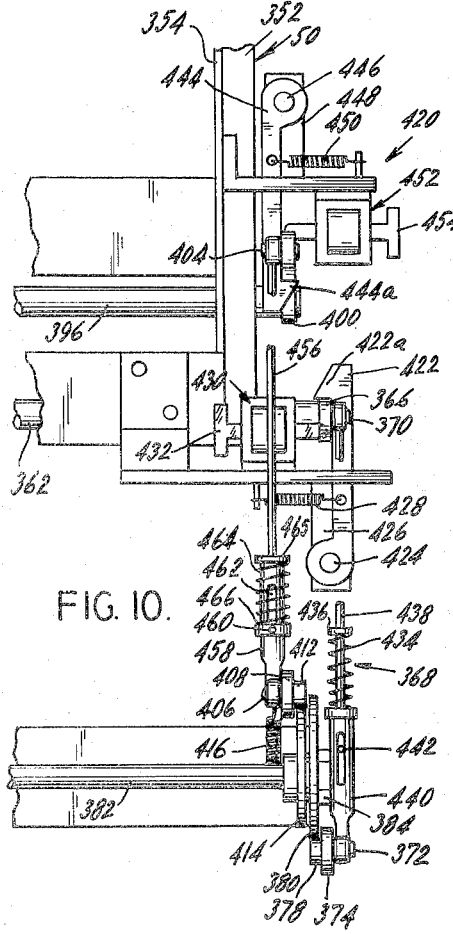
FIG. 10 is a partial front elevational view of the machine illustrating portions which are not shown in FIG. 1A, and specifically is a view looking from the left of the mechanisms as shown in the sectional view of FIG. 5 to further illustrate the control mechanisms for the supply feed means.

The precise operations of the electromechanical control mechanisms 394 and 420 may be seen in FIG. 10. As recited above, when the arm 366 is raised, the first feed arm 16 is lowered to feed a length of tubing T. This feed operation is controlled by the first feed arm cam 380. However, it is further controlled by means of a hook lever 422, having a hook 422a at its upper end engaged over the top of the arm 366 and pivotally connected at 424 to a rigid bracket 426 at its lower end. A spring 428 biases the hook arm 422 into hooking engagement with the arm 366. Thus, the only time that the arm 366 may be raised to feed a length of tubing T from the feed means 14 is when the hook arm 422 is pivoted about 424 to release the hook 422a. This is accomplished by means of the solenoid device 430 including the movable armature 432 which, upon energization of the solenoid 430 moves to the right to disengage the hook 422a from the arm 366 thus releasing the arm to move upwardly. Provision is made within the connecting rod 368 so that it does not bind when the hook arm 422 is engaged with the arm 366 and specifically includes a spring 434 which is engaged at one end between a collar 436 secured to the solid rod 438 of the connecting arm 368 and at the other end to a shoulder on the sleeve 440 which forms the base of the connecting rod 368. A pin 442 is secured to the solid rod 438 to control the movement of the solid rod 438 with respect to the sleeve 440. It will be realized that the spring 434 will tend to keep the connecting rod 368 at its fullest elongation, but will allow for the shortening of the connecting rod 368 when met with opposition, such as the engagement of the hook 422a with the arm 366.

The electromechanical control device 420 is similar to the device 394 and includes a hook arm 444 pivoted at 446 on a bracket 448 and having a hook 444a in engagement below the arm 400. A tension spring 450 biases the hook arm 444 into engagement with the arm 400 such that the arm 400 may not pivot downwardly therefore preventing the second feed arm 18 from pivoting upwardly out of its blocking position, unless the hook arm 444 is pivoted about its pivot 446 in opposition to the bias of the spring 450. This is accomplished by means of the solenoid device 452 which, when energized, forces its armature 454 into engagement with the hook arm 444 to move same outwardly to release the arm 400 and therefore the secondary feed arm 18. The connecting rod 402 interconnected between the arm 400 and the follower 408 leading to the second feed arm control cam 414 is similar in construction to the connecting rod 368 except that the arm 402 is constructed to normally be contained in its minimum length condition rather than its maximum length condition. Specifically, the connecting rod 402 consists of a solid rod 456 which is received within a sleeve 458 and has mounted thereon a pin 460 which extends outwardly from a slot 462. A compression spring 464 is positioned between a shoulder 465 formed on the upper end of the sleeve 458 and a collar 466 which is connected to pin 460 and movable therewith. It will be appreciated that the action of the spring 464 will be to bias the pin 460 toward the bottom of the slot 462 therefore to normally maintain the connecting rod 402 in its shortened condition. However, it is only at the moment that the solenoid device 452 is actuated by the control mechanisms which will be described below, that the connecting rod 402 may be shortened to pull the arm 400 downwardly and thereby raise the blocking extension 398 of the second feed arm 18 to allow a further length of tubing T to move down the supply exit passage 360 into position to be held by the blocking extension 364 of the first feed 16 preparatory to being fed to the transfer location TL.

At the transfer location TL there is mounted the positioning roller 20 which serves periodically to move a length of tubing T at the transfer location against the alignment member 22. The positioning roller 20 (see FIGS. 2A and 4) comprises a composition wheel of a truncated conical shape and is mounted upon a shaft 468 which is connected, through a universal 470, to a gear reduction unit 472 driven by a motor M-4. The shaft 468 is supported by a slide block bearing 474 which is mounted on a bracket 476 by means of a pivot arm 478 at pivot point 480. The pivot arm 478 is connected at its lower end to the slide bearing 474 and at its upper end to a piston and cylinder assembly 482 which is pivoted at 484 to the support 50 by means of a stationary bracket 486. When air pressure is introduced to the piston and cylinder assembly 482 through the air tube 488, the effective length of the piston and cylinder assembly 482 is elongated thus pivoting the arm 478 in a counterclockwise direction as seen in FIG. 4 about the bracket 480 to move the slide block 474 upwardly. By this motion, the shaft 468 is elevated at the end on which is engaged the positioning roller 20 such that the surface of the roller 420 is brought into engagement with the length of tubing T at the transfer location TL thus pushing the length of tubing T at the output end of the machine into contact with the positioning member 22 such that it is assured that the length of tubing T at the transfer location TL is properly located aligned.

Further advancement means are provided and include the pulse advancement roller 40 (see FIGS. 1B and 2A) which is a generally V-shaped roller as shown in FIG. 2A. It is mounted immediately below the feed path FP and is mounted on a rotating shaft 490 which is mounted within an actuating arm 492 which in turn is pivotally mounted upon the support bracket 58 at an extension arm 494. A rod 496 interconnects the actuating arm 492 and an appropriate cam on the main cam shaft 100 through a conventional linkage, to move the actuating arm 492 upwardly to bring the pulse advancement roller 40 into contact with a length of tubing T in the feed path FP immediately before the advancement fingers 36, 38 are moved through their final pick-up motion. This moves the length of tubing T slightly forwardly along the feed path to insure that the advancement fingers 36, 38 securely engage the tubing T and draw same through the advancement stroke. This pulse advancement movement of the length of tubing T also provides the additional movement of the length of tubing T which allows for the slippage of the advancement fingers 36, 38 as the tubing is positioned against the stop mechanism 42 since, advantageously, the length of the stroke of the advancement fingers 36, 38 is set to be equal to the length of the section S cut from the tubing T. The pulse advancement roller 40 is driven by means of a link chain 497 which is engaged about a pair of appropriate pulleys on the shafts 468 and 490. Thus, the pulse advancement roller 40 is driven by the motor M-4.

The blocking gate 15, best seen in FIGS. 2A and 4, comprises an elongated gate member 498 which extends substantially the entire width of the supply hopper 12 along the transfer locations TL and is mounted for vertical movement on a plurality of support arms 500 which are rigidly attached to the blocking gate pivot shaft 502 which, in turn, is mounted for rotation in a number of approprate bearing brackets 504 secured to the main support 54. An actuating arm 506 is rigidly secured to the pivot shaft 502 and extends in the opposite direction from the blocking member 498 and is pivoted, at 508 to a connecting rod 510 which in turn is pivoted at 512 to a double arm follower lever 514 which is operatively engaged with a blocking gate control cam 516 on the cam shaft 100 The double arm follower lever 514 has a follower roller 518 and is pivotally mounted on the support at bracket 520 and specifically at a pivot 522 such that when the follower roller 518 engages a high portion of the cam 516, the blocking gate 15 is lowered into its blocking position and, conversely, when the roller 518 is engaged with a low portion of the cam 516, the blocking gate 15 is raised to its up position allowing a length of tubing T at the transfer locations to roll downwardly into the feed path FP. A tensionspring 524 is engaged between the actuating arm 506 and a spring bracket 526 to bias the follower roller 518 into engagement with the cam 516 and therefore to bias the blocking gate 15 into its raised position.

Figure 3:
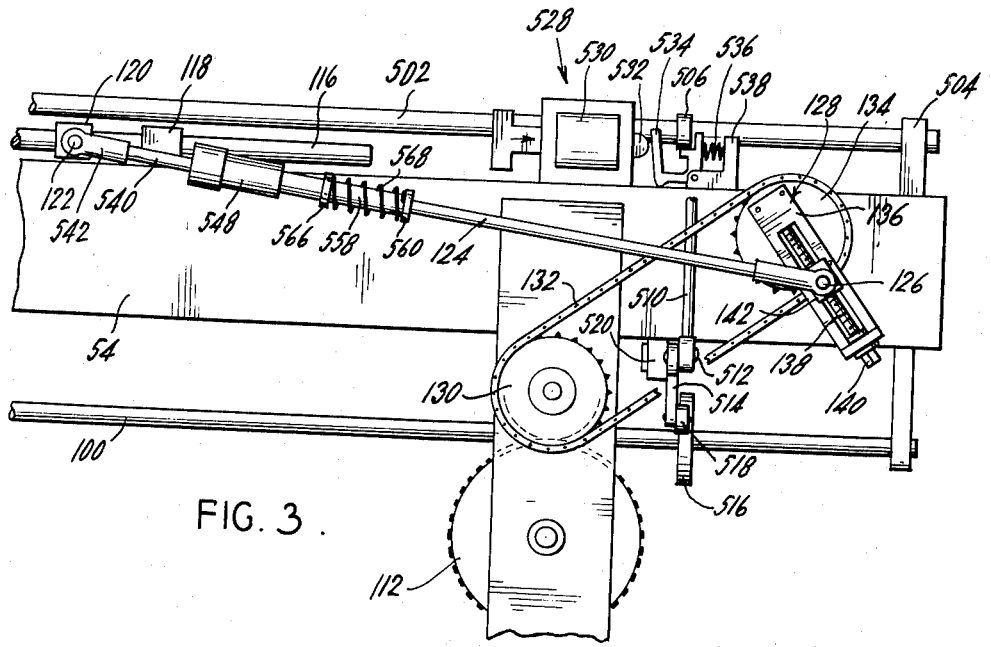
FIG. 3 is a partial rear elevational view of the machine illustrating the main advancement crank.

An electromechanical control device 528 (see FIGS. 2A and 3) is superimposed upon the mechanical control for the blocking gate 15 to assure that it is raised only at the proper instant for t he delivery of a length of tubing T from the transfer location TL to the feed path FP. The control device 528 is generally similar to the control devices 394 and 420 described in connection with the feed means 14 and it includes a solenoid mechanism 530 having a moving armature 532 which is operatively engaged with a spring loaded drop arm 534 which is normally biased, by the spring 536 positioned between the bracket 538 and the blocking member 534, to prevent the downward movement of the actuating arm 506 and therefore to prevent the raising of the blocking member 498 of the blocking gate 15. However, when the solenoid 530 is energized, the armature 532 moves to the right as shown in FIG. 3 to move the blocking member 534 against the bias force of the spring 436 to allow the actuating arm 506 to move downwardly thus raising the blocking gate 15 and allowing a length of tubing T to move from the transfer location TL to the feed path FP. The energization of the solenoid 530 and therefore the delivery of a length of tubing T to the feed path FP is controlled by a cam positioned on the main cam shaft 100 and an appropriate interengaged switch as will be described below.

As described, it is an object of the invention to sever individual sections S from a length of tubing T with a minimum amount of time spend per unit section S. In order to accomplish this result, the machine according to the present invention not only performs each of the operations one immediately after the other, with the cycle of operations being conducted at a relatively high rate, but the machine further performs selected operations at an accelerated pace. In one instance a standard mechanism is used for this purpose. Specifically the use of a Geneva wheel within the power transmission chain produces quick pulses of movement due to the inherent performance characteristics of that device. Other nonstandard devices are similarly employed. The advancement connecting rod 124 interconnected between the adjustable crank 128 and the advancement rod 16 is provided with mechanisms which superimpose upon the normal crank drive a further acceleration and de-acceleration of the operating element to produce shorter time interval during selected portions of the operating cycle of the machine. Specifically, the constructions of the advancement connecting rod 124, best seen in the detailed sectional view of FIG. 12, incorporates constructions which quickly move the advancement figures 36, 38 through the pick-up stroke by effectively shortening the length of the connecting rod 124 during that portion of the cycle. Similarly, by the same pneumatic controls, the connecting rod 124 is elongated during the advance stroke to speed up the rate of travel of the advancement mechanisms 144 during the advanced stroke to decrease the time of that operation. The components of the compensating connecting rod 124 which perform these features include a first solid rod portion 540 with an associated pivot mounting bracket 542 at one end of the connecting rod 124 and a second elongated solid rod 544 and its associated pivot mounting 546 at the other end of the device. A cylinder assembly 548 having a hollow cylinder chamber 550, is secured to the first rod section 540 and an appropriate air entry passage 552 is formed interconnecting an air entry tube 554 with the internal chamber 550 within the cylinder 548. A piston 556 is secured to the end of the elongated rod 544 opposite from the pivotal mounting 546 and is received in the cylinder chamber 550 such that upon the introduction of air through the entry port 552, the piston 556 will be driven the opposite end of the cylinder 548 and the connecting rod 124 effectively lengthened. Connected to and extending from the piston assembly 548 is a sleeve 558 surrounding the rod 544 which has formed at one end a collar 560. The sleeve has formed therein a slot 562; a pin 564, which is rigidly connected to the rod 544, extends outwardly of the sleeve 558 through the slot 562. A collar 566 is secured to the pin 564 and surrounds the sleeve 558 such that movement of the rod 544 within the sleeve 558 will produce corresponding movement of the collar 566 along the length of the sleeve 558. A compression spring 568 is secured between the respective collars 560 and 566 and biases the pin 564 toward one end of the slot 562 such that the entire assembly is biased toward the effective shorter length of the connecting rod 124. It will be appreciated that upon introduction of air pressure through the entry port 552, the spring 568 will be compressed to elongate the effective length of the connecting rod 124; the release of pressure outwardly from the entry port 552 will correspondingly cause the connecting rod 124 to contract under the bias force of the spring 568. The air pressure for the connecting rod 124 is supplied from an appropriate cam and valve on the main cam shaft 100 such that the cylinder 548 is charged with air during the advancement stroke of the advancement means thereby to elongate the connecting rod 124 and therefore increase the speed of the advancement mechanisms and particularly of the advancement fingers 36, 38 during their material advancement stroke. Conversely, immediately after a section of tubing S is severed from a length of tubing T, the air pressure within the cylinder 548 is released to reduce the effective length of the connecting rod 124 thereby to quickly move the advancement fingers 36, 38 to the end of their pick-up stroke. Accordingly, the connecting rod 124 acts to further increase the speed of the transfer mechanisms during those portions of the machine cycle which can be accelerated without loss of quality thereby to further decrease the per unit time of production.

Figure 13:
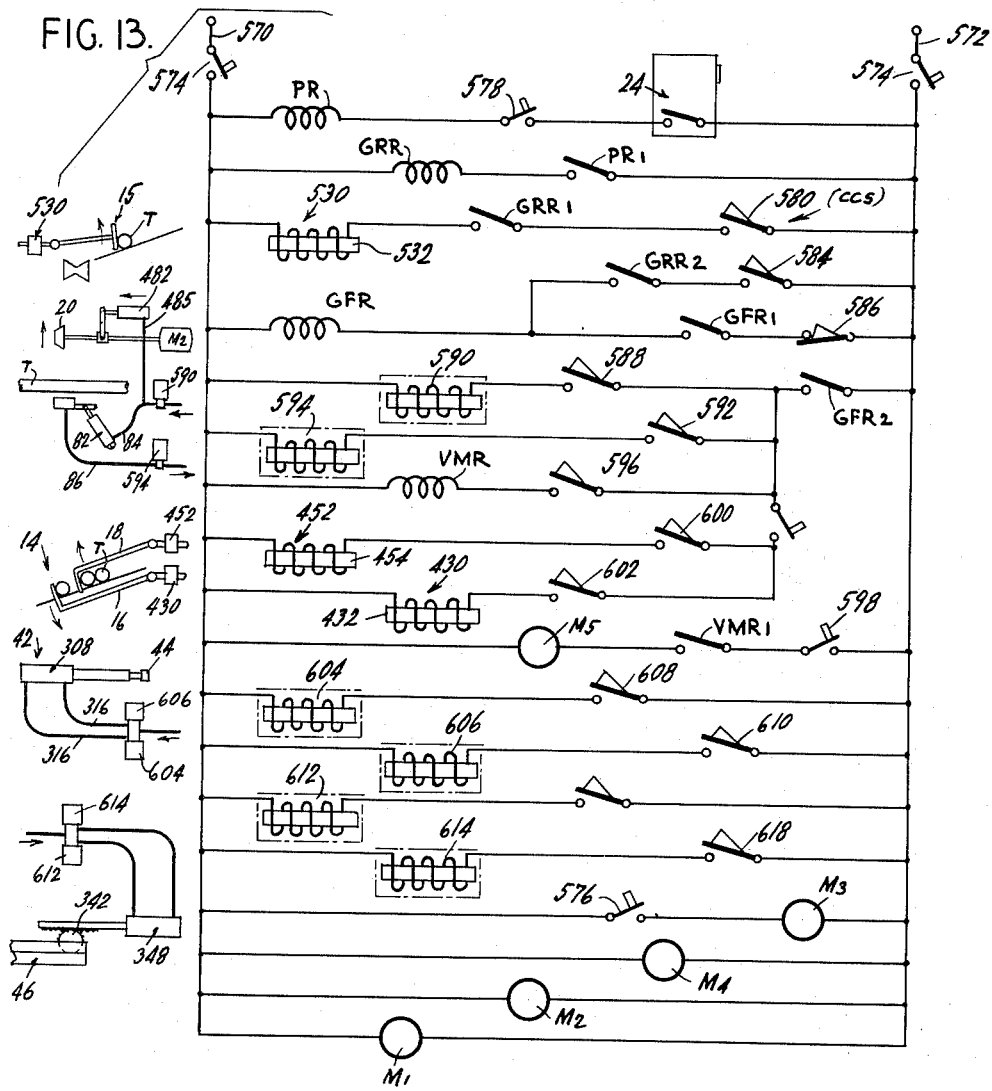
FIG. 13 is a schematic view of the control circuit including the electrical, electromechanical and hydraulic elements incorporated to control the movement of the various operational mechanisms in the machine according to the present invention.

The control mechanisms for the tubing severing machine 10 generally includes electromechanical and hydraulic devices which are illustrated schematically in FIGS. 13 and 14. A description of these control circuits will be made prior to a description of the operation of the machine, which, it is believed, will aid in the understanding of the device. Referring specifically to the electrical schematic view of FIG. 13, it is seen that a pair of alternating current power lines 570, 572 are provided with an appropriate voltage therebetween. A two-pole hand controlled switch 574 is provided to introduce current to the electrical circuit as a whole. Through appropriate wiring the motors M–1 which powers the main drive, M–2 the tubing rotating roller, M–3 which drives the water wheel belt 262 and M–4 which drives the conical positioning roller and the pulse advance roller are connected across the power lines 570, 572. A hand controlled switch 576 is provided in series with motor M–3 to independently control the drive for the severing wheel water belt. The photocell or electric eye unit 24 is schematically illustrated as a single pole switch in series with a photocell relay designated by the notation PR which is also in series with a hand controlled switch 578. With the hand switch 578 engaged, the photocell relay PR will be energized by the electric eye unit 24 when that unit detects an absence of glass at the appropriate location in the feed path FP. Upon such a circumstance, the photocell relay PR will be energized and the first contact of the relay PR, contact PR1, will close thus energizing the glass release relay GRR. Upon energization of the glass release relay GRR, its first contact GRR1, which is in series with the solenoid device 530 which controls the blocking gate 15, is closed to energize the solenoid 530. Also in series with the contact GRR1 and the solenoid 530 is a cam controlled switch 580 which closes the circuit to the solenoid 530 at exactly the right moment to release a length of tubing T from the transfer location TL into the feed path FP.

The switch 580 is one of the several cam controlled switches which are mounted upon a plate 582 secured to the main support beam 54 and best seen in FIG. 1A. For purposes of this disclosure, the several cam control switches mounted on the plate 582 and their associated cams secured to the main cam shaft 100 are generally designated by the notation CCS indicating cam controlled switch. In addition to the 10 cam controlled switches CCS on the plate 582, a further pair of cam controlled switches CCS are mounted on the main support beam 54 at a slight distance from the plate 582 as seen in FIG. 1B.

The second contact GRR2 of the glass release relay GRR is similarly closed upon energization of the relay GRR when the electric eye unit 24 detects the absence of glass in the feed path FP thereby to energize the glass feed relay GFR provided that the cam controlled switch 584, which is in series with the contact GRR2 and the relay GFR, is closed. The switch 584 is closed by the appropriate cam on the cam shaft 100 only at the proper moment for the operations of the vacuum transfer device to feed a length of tubing T from the transfer location to the severing path for the trim cut operation. A first contact GFR1 of the glass feed relay GFR forms a holding circuit, in series with a cam control switch 586, for the relay GFR with the switch 586 breaking the holding circuit at the completion of the advancement cycle of the vacuum feed device 26. The second contact GFR2 of the glass feed relay GFR closes upon energization of the glass feed relay GFR and effectively energizes the circuit for the operation of the vacuum transfer device 26, the positioning roller 20 and the feed means 14 at the supply hopper 12. The first branch of this circuit includes a cam control switch 588 in series with a solenoid operated valve 590 which controls the flow of air to the piston and cylinder assembly 82 which in turn controls the engagement of the vacuum advance device 26 with a length of tubing T. The appropriate cam on the main cam shaft 100 therefore triggers the valve 590 and commences engagement of the vacuum transfer device with a length of tubing T at the proper moment. A second branch of the circuit includes a further cam controlled switch 592 in series with a further solenoid valve 594 which is engaged with the vacuum supply tube 86 and effectively opens the valve 594 for the delivery of vacuum to the vacuum head 62 of the vacuum transfer device 26. The third branch of the circuit includes the vacuum motor relay VMR in series with a still further cam controlled switch 596 which energizes the vacuum motor relay VMR at the proper moment. It will be seen further down in the schematic view of FIG. 13 that the contact VMR1 of the vacuum motor control relay is in series with a vacuum motor M-5 and is also in series with a hand controlled switch 598 such that the vacuum circuit may be manually deenergized if desired. Thus, upon the original detection of the absence of glass, the chain of operative elements within the electrical control circuit operates to energize the glass feed relay GFR and to thereby energize the valve 590 and 594 and to commence operations of the vacuum motor M-5 to effect operations of the vacuum transfer device 26.

The operations of the positioning roller 20 and specifically of its control piston and cylinder assembly 482 are also controlled by the circuit which governs operations of the vacuum transfer device 26. Specifically, the valve 590 which delivers pressured air to the piston and cylinder assembly 82 of the vacuum advance device also delivers pressured air to the tubing 485 of the piston and cylinder assembly 482 which raises the positioning wheel 20 into engagement with a length of tubing T at the transfer location TL to position same against the alignment member 22.

The glass feed relay CFR, as energized by the detection of the absence of glass within the feed path, also effects the operation of the feed mean 14 which deposits length of tubing T, one at a time, from the exit passage 360 of the supply hopper 12 to the transfer location TL. Specifically, the feed means 14 are controlled through a circuit which activated by a hand switch 598 which, when closed, completes the circuit to the solenoid device 430, 452 which are in series with a pair of cam controlled switches 600, 602. These cam controlled switches are closed by appropriate cams on the main cam shaft 100 and effectively operates the solenoid device 530 and then the solenoid device 552 to move the feed arms 16, 18 in proper order to feed length of tubing T from the supply hopper 12 to the transfer location TL.

A further branch of the control circuit includes a pair of solenoid valves 604, 606 which are appropriately connected to the stop mechanism 42 and particularly to the control piston and cylinder assembly 308 through the supply line 314, 316. The solenoid valve 604, 606 are in series respectively with the cam controlled switches 608, 610 which are controlled by appropriate cams driven by the main cam shaft 100 such that the stop mechanism 42 and particularly the tubing contacting member 44 are moved at the proper moment to engage the end of a length of tubing T at the positioning location PL and to retract the tubing contacting member 44 during the heating and severing operations of the machine 10.

The final section of the control circuit includes the control means for the swinging movement of the discharge cradle 46 as actuated by the rack 344 and pinion 342. Specifically, a pair of solenoid valves 612, 614 are connected in series respectively with the cam controlled switches 616, 618 which are appropriately driven by cams on the main cam shaft 100. The valves 612, 614 are connected through appropriate pneumatic tubing to the piston and cylinder assembly 348 to control the movement of the rack 344 and thereby to control the swinging movement of the discharge cradle 46. As described, the cam control switches 616, 618 effectively control the valve 612, 614 such that the discharge casing 46 is positioned immediately below the feed path FP at the end of the severing operation and the cradle is then swung outwardly to transport the severed section S into position to be received by appropriate transfer mechanisms in conjunction with the next successive manufacturing operation.

The pneumatic circuit incorporated in the machine 10 is illustrated in FIG. 14 and includes a main air pressure line 620, which, through appropriate piping, is connected to the various pneumatically operated elements. Specifically, a first branch of the supply line 620 is connected to the cam control valve 336 which is controlled by the cam 334 and the main cam shaft 100 which is connected, through the supply line 332 to, the piston and cylinder assembly 326 of the discharge cradle 46 and specifically to the crank arm 330 which opens and closes the discharge cradle 46 at the proper points during the cycle of operation of the machine 10. A second branch of the supply line 620 is connected to a cam controlled valve 622 which in turn is activated by a cam 624 mounted on the main cam shaft 100. The valve 622 is connected, through appropriate tubing, to the piston and cylinder assembly 180 and the arm 178 which controls the action of the advancement fingers 36, 38. The cam 624 functions to open the valve 62 thereby to close the fingers 36, 38 at the end of the pick-up stroke of the advancement means and to open those fingers after the length of tubing T has been moved to the positioning location PL.

The final branch of the pneumatic line 620 is connected to a still further solenoid valve 626 which is operatively engaged with a cam 628 mounted on the cam shaft 100 and controls both the roller motor anti-bounce piston 216 and the control cylinder 548 of the main crank connecting rod 124. Specifically, the valve 626 which is supported on the main support 54 at bracket 630 (see FIG. 1A) is connected through tubing 632 to the piston and cylinder assembly 216 which engages the arm 192 of the rotating roller 32 to prevent the roller 32 from bouncing on a length of glass tubing T during the heating and severing operation. A second branch from the valve 626, specifically the tubing 545, is connected to the piston 548 of the controllled main connecting rod 124. The cam 628 and the valve 626 function to introduce air into the pistons 216 and 548 at the proper moment during the cycle of operations of the machine to dampen out any bouncing which might occur of the rotating roller 32 and to speed up the operations of the advancement mechanisms in its pick-up and advance strokes.

A further appreciation of the glass covering machine according to the present invention will be appreciated by consideration of the following description of the operation of the machine. Description will be made of the machine in the condition wherein a length of tubing T has been completely cut into sections such that no further tubing is positioned at the severing line SL. In this state, the photoelectric unit 24 detects the absence of a length of glass tubing and, through the electrical control circuit illustrated in FIG. 13, initiates the feeding of a length of tubing T from the transfer location TL to the feed path and a complementary feeding of a further length of tubing from the supply hopper 12 to the transfer location. Specifically, the blocking gate 15 is raised such that a length of tubing rolls downwardly into the feed path FP.

Thereafter, and after the blocking gate 15 has been repositioned in its blocking configuration, the feed arms 16, 18 are actuated such that a next length of tubing T is allowed to roll downwardly to the transfer location TL and a still further length of tubing is separated from the remaining lengths at the tubing exit passage 360 and moved into position to be fed during the next successive operations. By means of the detection of the absence of a length of glass tubing T at the feed path FP, the vacuum transfer device 26 is actuated such that the next operation of the machine will be a trim cut rather than a normal severing of a section S. The vacuum transfer device will engage the length of tubing in the feed path FP and will move same from the supply end toward the output end of the machine. The amount of initial movement of the glass tubing T is sufficient such that approximately one and one half inches of the forward end of the tubing extend beyond the severing line SL. The rotating roller 32 is then actuated and comes into contact with the tubing T to rotate same as the tubing is supported upon the pairs of rollers 186, 188. The heater element 28 is then brought into operative engagement with the tubing to heat the external surface thereof and, immediately after, the water cooled severing wheel 30 is brought into contact with the periphery of the tubing T, to sever the trimming section from the tubing. With this trimming operation completed, the machine 10 continues in a repetitive cycle of operation to continuously cut the section S of tubing from the machine.

The continuous severing operation proceeds after the trimming operation by the actuation of the advancement mechanisms including the advancement fingers 26, 28 which move through their pick-up stroke at an accelerated rate due to the control features of the advancement crank 124 and the Geneva drive such that the advancement fingers 26, 28 move extremely quickly at the end of their pick-up stroke. At the same time, the pulse advancement roller 40 engages the length of tubing T to move same a slight distance past the severing line SL to assure that the advancement fingers 36, 38 will accurately engage the forward end of the length of tubing T. The advancement fingers will then move to their advancement stroke at an accelerated rate due to the characteristics of the Geneva wheel drive and the additive control of the advancement connecting arm 124 such that the forward end of the tubing T is brought with a minimum expenditure of time, into contact with the tubing contacting member 44 of the stock mechanism 42 to accurately locate the forward end of the tubing T at the positioning location PL. The positioning location is such that the distance between the positioning location and the severing line is exactly equal to the length of the section S of tubing desired to be severed. At this stage of operations, the tubing is rotated by the roller 32, is heated by the element 28 and is severed by the wheel 30 with the section S of tubing falling downwardly into the discharge cradle 46. As the cradle 46 swings outwardly to be opened to deposit the section S of tubing on an appropriate conveyor to carry same to mechanisms to perform the next successive manufacturing operations, the cycle of operation of the machine continues to successively cut section S from the length of tubing T.

Although the disclosure above and the drawings presented herewith, illustrate only one preferred embodiment of the present invention, it must be appreciated that a variety of designs may be made by an engineer in the manufacture of a machine incorporating the teachings of the inventions. Therefore, it should be appreciated that machines which vary in greater and lesser extents from the specific machine illustrated herein may nevertheless incorporate the teachings of the present invention. Therefore, the following claims should be construed broadly and in a manner consistent with the spirit and scope of the invention.

What we claim is:

1. A machine for cutting elongated lengths of thermoplastic tubing into a plurality of sections of predetermined length comprising in combination a supply hopper for storing a plurality of lengths of tubing, means defining a feed path, feed means for feeding lengths of tubing one at a time from said hopper to said feed path, trim advancement means for advancing a length of tubing to a severing line on said feed path, said trim advancement means advancing the end of said length a short distance beyond said severing line such that the end of said length may be trimmed therefrom, detection means adjacent said severing line for detecting the absence of a length of tubing in said feed path at said severing line and operatively interconnected with said feed means for feeding a length of tubing to said feed path when said detection means registers an absence of a length of tubing at said severing line, means adjacent said severing line for selectively rotating a length of tubing about its axis, a severing tool at said severing line, means mounting said tool for selective movement toward and away from said feed path, work heating means at said severing line selectively engageable with a length of tubing in said feed path for heating same preparatory to a severing operation, pulse advancement means mounted along said feed path and operable to advance a length of tubing within said path a short distance beyond said severing line after a section has been severed from said length of tubing, section advancement means movable toward and away from each other, carriage means mounting said section advancement means for movement along said feed path toward said severing line through a pick-up stroke at the end of which said section advancement means engages a length of tubing and for movement away from said severing line through a work-advancement stroke with one end of said length of material being advanced to a positioning location space from said severing line a distance equal to the length of the section to be severed, drive means for actuating the foregoing structures including means for moving said carriage means at a relatively high velocity during said advancement stroke and said pick-up stroke and at a relatively low velocity during at least one portion of its movement, and control means for operating said structures in timed cyclical order for feeding a length of tubing to said feed path, advancing said length of tubing beyond said severing line, severing the forward end of said length of tubing, further advancing said length of tubing at a rapid speed to said locating position, severing a section of desired dimension from said length of tubing, moving said section advancement means through the pick-up stroke at a rapid rate, and repeating said advancement and severing operations in timed, cyclical order.

2. A machine for cutting elongated lengths of thermoplastic tubing into a plurality of sections of predetermined length, said machine comprising in combination an inclined supply hopper for storing a plurality of lengths of tubing in parallel relationship, means defining a feed path parallel for feeding lengths of tubing one at a time from said hopper to said feed path, detection means adjacent said severing line for detecting the absence of a length of tubing in said feed path at said severing line and operatively interconnected with said feed means for feeding a length of tubing from said supply hopper to said feed path when said detection means registers an absence of a length of tubing at said severing line, a rotating wheel ajacent said severing line for selectively rotating a length of tubing about its axis, a severing tool at said severing line, means mounting said tool for selective movement toward and away from said feed path, work heating means at said severing line selectively engageable with a length of tubing in said feed path for heating same preparatory to a severing operation, pulse advancement means monuted along said feed path and operable to advance a length of tubing within said path at short distance beyond said severing line after a section has been severed from said length of tubing, section advancement means movable toward and away from each other, carriage means mounting said section advancement means for movement along said feed path toward said severing line through a pick-up stroke at the end of which said section advancement means engages a length of tubing and for movement away from said severing line through a work-advancement stroke with one end of said length of material being advanced to a positioning location, a stop mounted at said positioning location, said stop including a tubing-contacting body, and means mounting said tubing contacting body for movement along said feed path between a tubing-contacting position and an inactive position, drive means for actuating the foregoing structures including means for moving said carriage means at a relatively high velocity during said advancement stroke and said pick-up stroke and at a relatively low velocity during at least one portion of its movement, and control means for operating said structures in timed cyclical order for feeding a length of tubing from said supply hopper to said feed path, advancing said length of tubing at a rapid rate to said locating position, severing a section of desired dimension from said length of tubing, moving said carriage means at a rapid rate through said pick-up stroke, and repeating said advancement and severing operations in timed, cyclical order.

3. A machine for cutting elongated lengths of thermoplastic tubing into a plurality of sections of predetermined length, said machine comprising in combination an inclined supply hopper for storing a plurality of lengths of tubing in parallel to and adjacent said supply hopper, hopper feed means for feeding lengths of tubing one at a time from said hopper to said feed path, trim advancement means for advancing a length of tubing to a severing line on said feed path, said trim advancement means advancing the end of said length a short distance beyond said severing line such that the end of said length may be trimmed therefrom, said trim advancement means comprising a vacuum head mounted for reciprocation parallel to said feed path and selectively engageable with a length of tubing for advancing same along said feed path, detection means adjacent said severing line for detecting the absence of a length of tubing in said feed path at said severing line and operatively interconnected with said hopper feed means for feeding a length of tubing from said supply hopper to said feed path when said detection means registers an absence of a length of tubing at said severing line, a rotating wheel adjacent said severing line selectively eingageable with a length of tubabout its axis, a severing tool at said severing line, means mounting said tool for selective movement toward and away from said feed path, work heating means at said severing line selectively engageable with a length of tubing in said feed path for heating same preparatory to a severing operation, a pulse advancement wheel mounted along said feed path and operable to advance a length of tubing within said path a short distance beyond said severing line after a section has been severed from said length of tubing, a pair of advancement fingers movable toward and away from each other, carriage means mounting said advancement fingers for rapid movement along said feed path toward said severing line through a pick-up stroke at the end of which said fingers engage a length of tubing and for rapid movement away from said severing line through a work-advancement stroke with one end of said length of material being advanced to a positioning location, a stop mounted within said feed path at said positioning location said stop including a tubing-contacting body, and means mounting said tubing contacting body for movement along said feed path between a tubing-contacting position and an inactive position, drive means for actuating the foregoing structures including accelerating means for moving said carriage means at a relatively high velocity during said advancement stroke and said pick-up stroke and at a relatively low velocity during at least one portion of its movement, said accelerating means including a Geneva drive in combination with an advancement crank driven by said Geneva drive, and a connecting rod pivotally secured between said crank and said advancement carriage, connecting rod including means for elongating said rod during portions of the cycle of said machine and for shortening said rod during other portions of the cycle, said means including a hydraulic piston and cylinder assembly with the piston thereof attached to one end portion of said rod and the cylinder thereof attached to the other end portion of said rod, said rod becoming elongated when air pressure is applied to one side of said piston and becoming shortened when air pressure is applied to the other side thereof, said Geneva wheel and said piston and cylinder assembly materially increasing the speed to said advancement carriage during said pick-up stroke and said advancement stroke, and control means for operating said structures in timed cyclical order for feeding a length of tubing to said feed path, advancing said length of tubing beyond said severing line, severing the forward end of said length of tubing, moving said carriage means through its advancement stroke at a rapid rate for further advancing said length of tubing to said locating position, severing a section of desired dimension from said length of tubing, moving said carriage means through its pick-up stroke at a rapid rate, and repeating said advancement and severing operations in timed, cyclical order.

4. A machine for cutting elongated lengths of thermoplastic tubing into a plurality of sections of predetermined length, said machine comprising in combination an inclined supply hopper for storing a plurality of lengths of tubing in parallel relationship, means defining a feed path parallel to and adjacent said supply hopper, hopper feed means for feeding lengths of tubing one at a time from said hopper to said feed path, detection means adjacent said severing line for detecting the absence of a length of tubing in said feed path at said severing line and operatively interconnected with said hopper feed means for feeding a length of tubing from said supply hopper to said feed path when said detection means registers an absence of a length of tubing at said severing line, a rotating wheel adjacent said severing line for selectively rotating a length of tubing about its axis, a severing tool at said severing line, means mounting said tool for selective movement toward and away from said feed path, work heating means at said severing line selectively engageable with a length of tubing in said feed path for heating same preparatory to a severing operation, pulse advancement means mounted along said feed path and operable to advance a length of tubing within said path a short distance beyond said severing line after a section has been severed from said length of tubing, section advancement means movable toward and away from each other, carriage means mounting said section advancement means for rapid movement along said feed path toward said severing line through a pick-up stroke at the end of which said section advancement means engages a length of tubing and for rapid movement away from said severing line through a work-advancement stroke with one end of said length of material being advanced to a positioning location, a stop mounted at said positioning location said stop including a tubing-contacting body, and means mounting said tubing contacting body for movement along said feed path between a tubing-contacting position and an inactive position, drive means for actuating the foregoing structures including accelerating means for moving said carriage means at a relatively high velocity during said advancement stroke and said pick-up stroke and at a relatively low velocity during at least one portion of its movement, said accelerating means including a Geneva drive in combination with an advancement crank driven by said Geneva drive, and a connecting rod pivotally secured between said crank and said advancement carriage, connecting rod including means for elongating said rod during portions of the cycle of said machine and for shortening said rod during other portions of the cycle, said means including a hydraulic piston and cylinder assembly with the piston thereof attached to one end portion of said rod and the cylinder thereof attached to the other end portion of said rod, said rod becoming elongated when air pressure is applied to one side of said piston and becoming shortened when air pressure is applied to the other side thereof, said Geneva wheel and said piston and cylinder assembly materially increasing the speed of said advancement carriage during said pick-up stroke and said advancement stroke, and control means for operating said structures in timed cyclical order for feeding a length of tubing to said feed path, advancing said length of tubing beyond said severing line, severing the forward end of said length of tubing, moving said carriage means through its advancement stroke at a rapid rate for further advancing said length of tubing to said locating position, severing a section of desired dimension from said length of tubing, moving said carriage means through its pick-up stroke at a rapid rate, and repeating said advancement and severing operations in timed, cyclical order.

5. A machine for cutting elongated lengths of thermoplastic tubing into a plurality of sections of predetermined length, said machine comprising in combination an inclined supply hopper for storing a plurality of lengths of tubing in parallel relationship, means defining a feed path parallel to and adjacent said supply hopper, hopper feed means for feeding lengths of tubing one at a time from said hopper to said feed path, trim advancement means for advancing a length of tubing to a severing line on said feed path, said trim advancement means advancing the end of said length a short distance beyond said severing line such that the end of said length may be trimmed therefrom, said trim advancement means comprising a vacuum head mounted for reciprocation parallel to said feed path and selectively engageable with a length of tubing for advancing same along said feed path, detection means adjacent said severing line for detecting the absence of a length of tubing in said feed path at said severing line and operatively interconnected with said hopper feed means for feeding a length of tubing from said supply hopper to said feed path when said detection means registers an absence of a length of tubing at said severing line, a rotating wheel adjacent said severing line for selectively rotating a length of tubing about its axis, a severing tool at said severing line, means mounting said tool for selective movement toward and away from said feed path, work heating means at said severing line selectively engageable with a length of tubing in said feed path for heating same preparatory to a severing operation, a pulse advancement wheel mounted along said feed path and operable to advance a length of tubing within said path a short distance beyond said severing line after a section has been severed from said length of tubing, a pair of advancement fingers movable toward and away from each other, carriage means mounting said advancement fingers for rapid movement along said feed path toward said severing line through a pick-up stroke at the end of which said fingers engage a length of tubing and for rapid movement away from said severing line through a work-advancement stroke with one end of said length of material being advanced to a positioning location, a stop mounted within said feed path at said positioning location, said stop including a tubing-contacting body, and means mounting said tubing contacting body for movement along said feed path between a tubing-contacting position and an inactive position, drive means for actuating the foregoing structures including accelerating means for moving said carriage means at a relatively high velocity during said advancement stroke and said pick-up stroke and at a relatively low velocity during at least one portion of its movement, said accelerating means including a driven advancement crank and a connecting rod pivotally secured between said crank and said advancement carriage, said connecting rod including means for elongating said rod during portions of the cycle of said machine and for shortening said rod during other portions of the cycle, said means including a fluid piston and cylinder assembly with the piston thereof attached to one end portion of said rod and the cylinder thereof attached to the other end portion of said rod, said rod becoming elongated when fluid pressure is applied to one side of said piston and becoming shortened when fluid pressure is applied to the other side thereof, said piston and cylinder assembly materially increasing the speed of said advancement carriage during said pick-up stroke and said advancement stroke, and control means for operating said structures in timed cyclical order for feeding a length of tubing to said feed path, advancing said length of tubing beyond said severing line, severing the forward end of said length of tubing, moving said carriage means through its advancement stroke at a rapid rate for further advancing said length of tubing to said locating position, severing a section of desired dimension from said length of tubing, moving said carriage means through its pick-up stroke at a rapid rate, and repeating said advancement and severing operations in timed, cyclical order.

6. A machine for cutting elongated lengths of thermoplastic tubing into a plurality of sections of predetermined length, said machine comprising in combination an inclined supply hopper for storing a plurality of lengths of tubing in parallel relationship, means defining a feed path parallel to and adjacent said supply hopper, hopper feed means for feeding lengths of tubing one at a time from said hopper to said feed path, detection means adjacent said severing line for detecting the absence of a length of tubing in said feed path at said severing line and operatively interconnected with said hopper feed means for feeding a length of tubing from said supply hopper to said feed path when said detection means registers an absence of a length of tubing at said severing line, a rotating wheel adjacent said severing line for selectively rotating a length of tubing about its axis, a severing tool at said severing line, means mounting said tool for selective movement toward and away from said feed path, work heating means at said severing line selectively engageable with a length of tubing in said feed path for heating same preparatory to a severing operation, pulse advancement means mounted along said feed path and operable to advance a length of tubing within said path a short distance beyond said severing line after a section has been severed from said length of tubing, section advancement means movable toward and away from each other, carriage means mounting said section advancement means for rapid movement along said feed path toward said severing line through a pick-up stroke at the end of which said section advancement means engages a length of tubing and for rapid movement away from said severing line through a work-advancement stroke with one end of said length of material being advanced to a positioning location, a stop mounted at said positioning location said stop including a tubing-contacting body, and means mounting said tubing contacting body for movement along said feed path between a tubing-contacting position and an inactive position, drive means for actuating the foregoing structures including accelerating means for moving said carriage means at a relatively high velocity during said advancement stroke and said pick-up stroke and at a relatively low velocity during at least one portion of its movement, said accelerating means including a driven advancement crank and a connecting rod pivotally secured between said crank and said advancement carriage, said connecting rod including means for elongating said rod during portions of the cycle of said machine and for shortening said rod during other portions of the cycle, said means including a fluid piston and cylinder assembly with the piston thereof attached to one end portion of said rod and the cylinder thereof attached to the other end portion of said rod, said rod becoming elongated when fluid pressure is applied to one side of said piston and becoming shortened when fluid pressure is applied to the other side thereof, said piston and cylinder assembly materially increasing the speed of said advancement carriage during said pick-up stroke and said advancement stroke, and control means for operating said structures in timed cyclical order for feeding a length of tubing to said feeding path, advancing said length of tubing beyond said severing line, severing the forward end of said length of tubing, moving said carriage means through its advancement stroke at a rapid rate for further advancing said length of tubing to said locating position, severing a section of desired dimension from said length of tubing, moving said carriage means through its pick-up stroke at a rapid rate, and repeating said advancement and severing operations in timed, cyclical order.

7. In a machine for severing elongated lengths of glass tubing into sections of predetermined length including advancement means having an advancement carriage and tubing advancement fingers mounted on said carriage and movable between a tubing grasping position and a tubing release position with said carriage being movable through a pick-up stroke toward a severing line to move said fingers into position to grasp the end of a length of tubing to be severed and through an advancement stroke away from said severing line and toward a positioning location to advance said end of the tubing a distance beyond said severing line equal to the desired length of said sections, drive means for said advancement carriage comprising a Geneva drive in combination with an advancement crank driven by said Geneva drive, and a connecting rod pivotally secured between said crank and said advancement carriage, said connecting rod including means for elongating said rod during portions of the cycle of said machine and for shortening said rod during other portions of the cycle, said means including a hydraulic piston and cylinder assembly with the piston thereof attached to one end portion of said rod and the cylinder thereof attached to the other end portion of said rod, said rod becoming elongated when air pressure is applied to one side of said piston and becoming shortened when air pressure is applied to the other side thereof, said Geneva wheel and said piston and cylinder assembly materially increasing the speed of said advancement carriage during said pick-up stroke and said advancement stroke.

8. In a machine for severing elongated lengths of glass tubing into sections of predetermined length including advancement means having an advancement carriage movable through a pick-up stroke toward a severing line to move into position to grasp the end of a length of tubing to be severed and through an advancement stroke away from said severing line and toward a positioning location to advance said end of the tubing a distance beyond said severing line equal to the desired length of said sections, drive means for said advancement carriage comprising a Geneva drive in combination with an advancement crank driven by said Geneva drive, and a connecting rod pivotally secured between said crank and said advancement carriage, said connecting rod including means for elongating said rod during portions of the cycle of said machine and for shortening said rod during other portions of the cycle, said means including a hydraulic piston and cylinder assembly with the piston thereof attached to one end portion of said rod and the cylinder thereof attached to the other end portion of said rod, said rod becoming elongated when air pressure is applied to one side of said piston and becoming shortened when air pressure is applied to the other side thereof, said Geneva wheel and said piston and cylinder assembly materially increasing the speed of said advancement carriage during said pick-up stroke and said advancement stroke.

9. In a machine for severing elongated lengths of glass tubing into sections of predetermined length including advancement means having an advancement carriage movable between a tubing grasping position and a tubing release position with said carriage being movable through a pick-up stroke toward a severing line to move said fingers into position to grasp the end of a length of tubing to be severed and through an advancement stroke away from said severing line and toward a positioning location to advance said end of the tubing a distance beyond said severing line equal to the desired length of said sections, drive means for said advancement carriage comprising a source of rotating power, a driven advancement crank, and a connecting rod pivotally secured between said crank and said advancement carriage, said connecting rod including means for elongating said rod during portions of the cycle of said machine and for shortening said rod during other portions of the cycle, said means including a hydraulic piston and cylinder assembly with the piston thereof attached to one end portion of said rod and the cylinder thereof attached to the other end portion of said rod, said rod becoming elongated when air pressure is applied to one side of said piston and becoming shortened when air pressure is applied to the other side thereof, said piston and cylinder assembly materially increasing the speed of said advancement carriage during said pick-up stroke and said advancement stroke.

10. In a machine for severing elongated lengths of glass tubing into sections of predetermined length including advancement means having an advancement carriage and tubing advancement fingers mounted on said carriage and movable between a tubing grasping position and a tubing release position with said carriage being movable through a pick-up stroke toward a severing line to move said fingers into position to grasp the end of a length of tubing to be severed and through an advancement stroke away from said severing line and toward a positioning location to advance said end of the tubing a distance beyond said severing line equal to the desired length of said sections, drive means for said advancement carriage comprising a source of rotation, an advancement crank driven from said source, and a connecting rod pivotally secured between said crank and said advancement carriage, said connecting rod including means for elongating said rod during portions of the cycle of said machine and for shortening said rod during other portions of the cycle, said means including a hydraulic piston and cylinder assembly with the piston thereof attached to one end portion of said rod and the cylinder thereof attached to the other end portion of said rod, said rod becoming elongated when air pressure is applied to one side of said piston and becoming shortened when air pressure is applied to the other side thereof, said piston and cylinder assembly materially increasing the speed of said advancement carriage during said pick-up stroke and said advancement stroke.

No references cited.

WILLIAM W. DYER, Jr., *Primary Examiner.*